United States Patent
Ishihara et al.

(10) Patent No.: US 8,405,515 B2
(45) Date of Patent: Mar. 26, 2013

(54) CONTROL DEVICE AND METHOD

(75) Inventors: Naoyuki Ishihara, Kyoto (JP); Yosuke Tomita, Kasugai (JP); Naoki Hirobe, Kasugai (JP); Tadao Nishiguchi, Nagoya (JP); Shoji Mafune, Nagoya (JP)

(73) Assignee: OMRON Corporation, Kyoto (JP)

( * ) Notice: Subject to any disclaimer, the term of this patent is extended or adjusted under 35 U.S.C. 154(b) by 461 days.

(21) Appl. No.: 12/670,412

(22) PCT Filed: Jul. 25, 2008

(86) PCT No.: PCT/JP2008/063394
§ 371 (c)(1),
(2), (4) Date: Apr. 14, 2010

(87) PCT Pub. No.: WO2009/014212
PCT Pub. Date: Jan. 29, 2009

(65) Prior Publication Data
US 2010/0214112 A1 Aug. 26, 2010

(30) Foreign Application Priority Data

Jul. 26, 2007 (JP) .................................. 2007-194204

(51) Int. Cl.
*G08B 21/00* (2006.01)
(52) U.S. Cl. .................. 340/686.1; 340/5.62; 340/5.64; 340/5.72; 340/5.8; 340/10.1; 70/256
(58) Field of Classification Search ............... 340/686.1, 340/5.61, 5.62, 5.63, 5.64, 5.72, 825.69, 340/825.72, 10.1; 307/10.2, 10.4; 49/14
See application file for complete search history.

(56) References Cited

U.S. PATENT DOCUMENTS

| 5,334,969 | A | 8/1994 | Abe et al. | |
|---|---|---|---|---|
| 6,825,752 | B2 * | 11/2004 | Nahata et al. | 340/5.64 |
| 7,091,823 | B2 | 8/2006 | Ieda et al. | |
| 7,402,917 | B2 | 7/2008 | Gehin | |
| 2002/0093418 | A1 * | 7/2002 | Schmitz et al. | 340/5.62 |
| 2004/0066294 | A1 | 4/2004 | Ieda et al. | |
| 2004/0263161 | A1 | 12/2004 | Gehin | |
| 2007/0290794 | A1 * | 12/2007 | Teshima et al. | 340/5.64 |
| 2008/0314097 | A1 * | 12/2008 | Rohlfing et al. | 70/256 |

FOREIGN PATENT DOCUMENTS

| EP | 1 319 777 A1 | 6/2003 |
|---|---|---|
| EP | 1 456 489 A1 | 9/2004 |
| JP | 5-16764 A | 1/1993 |
| JP | 2820816 B2 | 1/1993 |
| JP | 11-315657 A | 11/1999 |

(Continued)

OTHER PUBLICATIONS

International Search Report w/translation from PCT/JP2008/063394 dated Oct. 28, 2008 (5 pages).

(Continued)

*Primary Examiner* — Daniel Wu
*Assistant Examiner* — Vishak Ganesh
(74) *Attorney, Agent, or Firm* — Osha Liang LLP

(57) ABSTRACT

A control device has a first sensor set with a first detection region, a second sensor set with a second detection region, and a control unit for controlling a predetermined operation based on a detection result by the first sensor and a detection result by the second sensor.

14 Claims, 27 Drawing Sheets

FOREIGN PATENT DOCUMENTS

| | | |
|---|---|---|
| JP | 2002-295094 A | 10/2002 |
| JP | 2004-92027 A | 3/2004 |
| JP | 2005-511932 A | 4/2005 |
| JP | 2006-144432 A | 6/2006 |
| WO | 03/050368 A1 | 6/2003 |

OTHER PUBLICATIONS

Written Opinion from PCT/JP2008/063394 dated Oct. 28, 2008 (4 pages).

\* cited by examiner

CONTROL DEVICE AND METHOD

TECHNICAL FIELD

The present invention relates to control devices and methods, as well as, programs, and in particular, to a control device and a method, as well as a program realizing unlocking and locking of a door of a vehicle that is easy to use for a user.

BACKGROUND ART

A passive entry system (PES) is widely known (see e.g., patent documents 1 and 2). There is a tendency to add a sensor for recognizing approach and contact of a user to a handle (hereinafter referred to as an outer handle), which is arranged on an outer side of a vehicle, to such a passive entry system. This sensor is a sensor functioning as a switch for performing unlocking and locking by the recognition result of the approach and the contact of the user. The sensor referred to herein is configured by a detection unit for outputting a predetermined detection amount as an electrical signal or the like, and a recognition unit for recognizing the approach and the contact of a human from the electrical signal or the like from the detection unit.

There are a number of methods related to the control of unlocking and locking in the passive entry system. For instance, a method of individually arranging a detection unit for unlocking and for locking individually, and unlocking according to a recognition result from a recognition unit based on the signal from the detection unit for unlocking and locking according to the recognition result from the recognition unit based on the signal from the detection unit for locking (hereinafter referred to as an individual detection control method) (see e.g., patent documents 1 and 2). A method of arranging one detection unit, and locking a door if in an unlocked state and unlocking a door if in a locked state according to a recognition result from a recognition unit based on a signal from the detection unit (hereinafter referred to as a single detection control method).

In patent document 1, the individual detection control method of attaching the respective detection unit for unlocking and for locking to different positions of the outer handle is proposed. In patent document 2, one detection unit is arranged for each of the front and the back of the outer handle with respect to one recognition unit. The individual detection control method in which the proximity (spaced apart by a predetermined short distance without contact) and the contact of a human are recognized by the signal from each detection unit in the recognition unit, and unlocking is carried out when recognized with the signal from the detection unit on the front and locking is carried out when recognized with a signal from a back electrode is proposed.

An electrostatic capacity sensor, and the like correspond to the sensor for recognizing the proximity and the contact.

The electrostatic capacity sensor is a sensor that uses a change in an electrostatic capacity involved in a change in a distance with a detecting object when the electrostatic capacity is formed between itself and the detecting object (hand approaching the vehicle herein), and that includes an electrostatic capacity→voltage conversion unit, that is, a detection unit for outputting a voltage proportional to the distance as a detection signal.

A sensor for recognizing the approach (spaced apart by a distance distant to a certain extent) is also known, which may be an electric wave sensor, and the like.

The electric wave sensor is a sensor that uses a time difference between a transmission wave and a reception wave that returns when reflected by an object, and that includes a detection unit for outputting a predetermined electric signal as a detection signal when the object enters a detection region. The detection region herein means a range of detection distance to a predetermined detecting object.

Patent document 1: Japanese Unexamined Patent Publication No. 2002-295094

Patent document 2: Japanese Unexamined Patent Publication No. 2004-92027

SUMMARY OF THE INVENTION

In the individual detection control method of patent document 1 and patent document 2, a sensor for recognizing the proximity and the contact is used. In this case, problems do not particularly arise in locking. However, a time lag from the contact of the user to the outer handle until the unlocking is completed generates in unlocking since a mechanical operation of driving a lock with a motor is performed. Thus, the unlocking may not make in time for a door opening operation, that is, a user operation of pulling the outer handle and opening the door, and the door may not be smoothly opened.

Furthermore, locking may be performed against the intention of the user in the individual detection control method since the detection distance is relatively long when the sensor for recognizing the approach, for example, the electric wave sensor is used for the sensor for unlocking and for locking.

In the single detection control method, the detection sensitivity needs to be to a relatively high sensitivity so that the change in an electrostatic capacity that is smaller than that in normal times can be detected when using for the sensor for recognizing the contact, for example, the electrostatic capacity sensor. However, false recognition of recognizing the proximity and the contact of the object although the proximity and the contact of the object do not exist may arise due to foreign noise and a characteristic change of an internal element, and the like if the detection sensitivity is set to a high sensitivity. Therefore, if the electrostatic capacity sensor is used in the single detection control method, the enhancement of the detection sensitivity and the reduction of the false recognition are in a trade-off relationship, and it is difficult to satisfy both.

One or more embodiments of the present invention accomplishes unlocking and locking of a door of a vehicle that is easy to use for a user.

A control device of one aspect of the present invention is a control device provided with: a first sensor set with a first detection region; a second sensor set with a second detection region; and a control unit for controlling a predetermined operation based on a detection result by the first sensor and a detection result by the second sensor.

The first sensor is variably set with the detection region; and the control unit can control a first operation based on the detection result of the first sensor set with the first detection region, and can control a second operation based on the detection result of the second sensor set with the second detection region.

The control device is a device for controlling locking and unlocking of a door of a vehicle; a first distance with respect to the door of the vehicle is set as the first detection region in the first sensor, and a second distance shorter than the first distance is set as the second detection region; when a state of the door of the vehicle is a locked state, the first sensor can detect an object when the object enters the first detection region, and the control unit can perform a control to unlock the door as the first operation when the object is detected by the first sensor; and when the state of the door of the vehicle is an unlocked state, the second sensor can detect an object when the object enters the second detection region, and the control unit can perform a control to lock the door as the second operation when the object is detected by the second sensor.

When the object is detected by the sensor, the control unit further can perform an authentication process of a human with a hand, the hand of the human being the object, and can perform a control to unlock or lock the door when the authentication is successful, and can perform a control to prohibit unlocking or locking of the door when the authentication fails.

The control device is a device for controlling locking and unlocking of a door of a vehicle; when a state of the door of the vehicle is a locked state, the first sensor can detect an object when the object enters the first detection distance, and the control unit can perform a control to unlock the door when the object is detected by the first sensor; and when the state of the door of the vehicle is an unlocked state, the second sensor can detect an object when the object enters the second detection distance, and the control unit can perform a control to lock the door when the object is detected by the second sensor.

The control unit can further perform a control to prohibit the locking of the door of the vehicle for a predetermined period when the object is detected by the first sensor.

The control unit can perform a control to stop the detecting operation by the second sensor for a predetermined period as the control to prohibit the locking of the door for a predetermined period.

The control unit can perform a control to prohibit the locking of the door of the vehicle for a predetermined period based on the detection result by the second sensor as the control to prohibit the locking of the door for a predetermined period.

The control unit can further perform a control to prohibit the unlocking of the door of the vehicle for a predetermined period when the object is detected by the second sensor.

The control unit can perform a control to stop the detecting operation by the first sensor for a predetermined period as the control to prohibit the unlocking of the door for a predetermined period.

The control unit can perform a control to prohibit the unlocking of the door of the vehicle for a predetermined period based on the detection result by the first sensor as the control to prohibit the unlocking of the door for a predetermined period.

The control unit can perform a control to supply power only to the first sensor when the state of the door of the vehicle is the locked state, and can perform a control to supply power only to the second sensor when the state of the door of the vehicle is the unlocked state.

The second sensor is an electrostatic capacity sensor; the first sensor is another type sensor in which a type differs from the electrostatic capacity sensor; the control device is a device for controlling locking and unlocking of a door of a vehicle; a first distance with respect to the door of the vehicle is set as the first detection region in the first sensor, and a second distance shorter than the first distance is set as the second detection region; the first sensor can detect an object when the object enters the first detection region; the second sensor can detect an object when the object enters the second detection region; and the control unit can perform unlocking or locking of the door when the object is detected by the second sensor.

The electrostatic capacity sensor and the other type sensor can be configured as an integrated module.

The electrostatic capacity sensor and the other type sensor can be installed at different locations.

The electrostatic capacity sensor can change a detection sensitivity of the electrostatic capacity sensor according to a presence of detection of the object by the other type sensor.

The electrostatic capacity sensor can enhance a detection sensitivity of the electrostatic capacity sensor based on the detection of the object by the other type sensor.

A control method of one aspect of the present invention is a control method of a control device including a first sensor set with a first detection region and a second sensor set with a second detection region; the method including the step of: controlling a predetermined operation based on a detection result by the first sensor and a detection result by the second sensor.

The first sensor is variably set with the detection region; and a first operation can be controlled based on the detection result of the first sensor set with the first detection region, and a second operation can be controlled based on the detection result of the second sensor set with the second detection region in the control of the predetermined operation.

According to one or more embodiments of the present invention, unlocking and locking of a door of a vehicle that is easy to use for a user can be realized.

Figure 1:
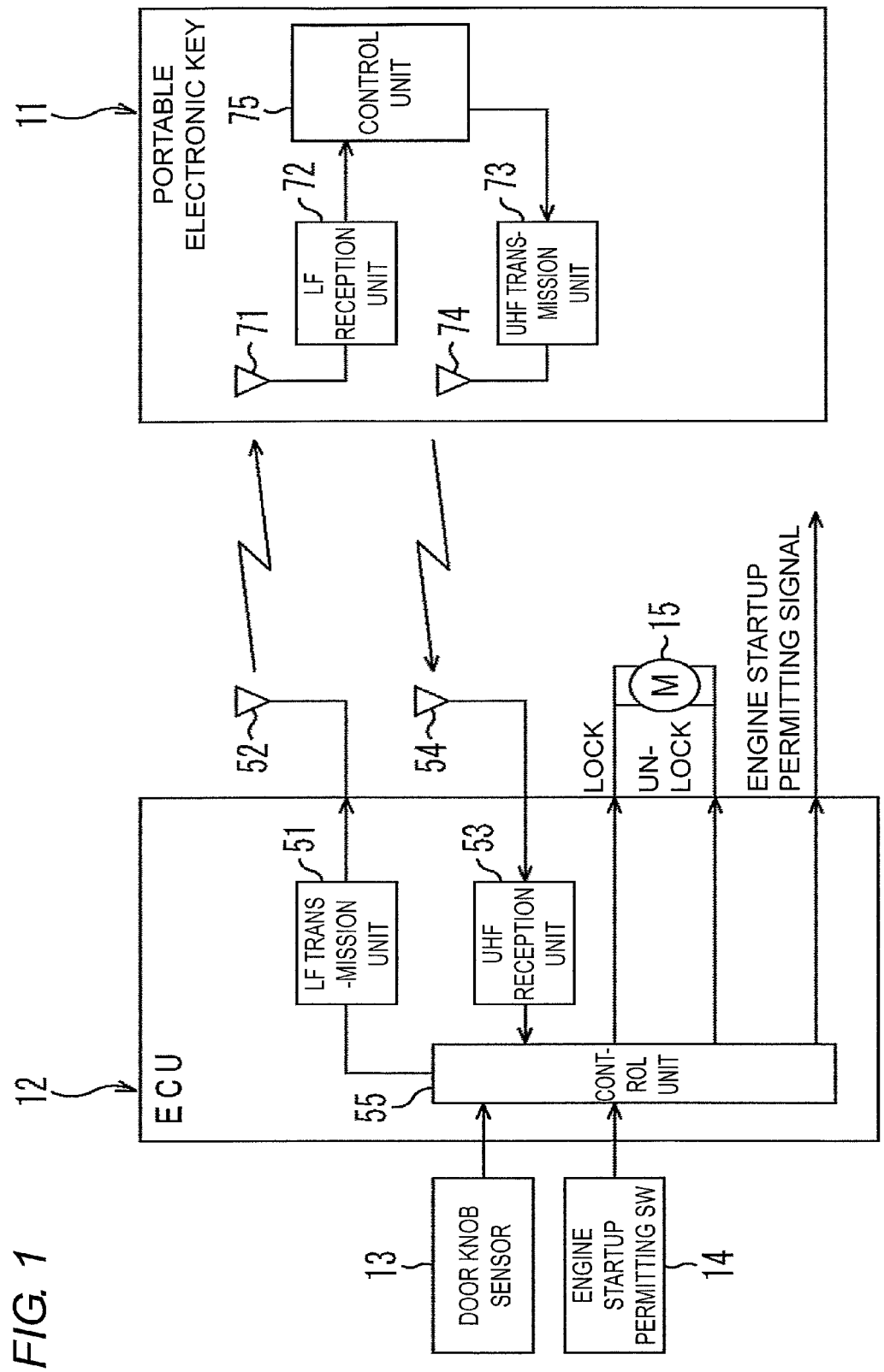
FIG. 1 is a block diagram showing a configuration example of a passive entry system.

DESCRIPTION OF SYMBOLS 11 portable electronic key
12 ECU
13 door knob sensor
15 motor
55 control unit
101 hand
111 outer handle
112 door
121 far detection region (electric wave detection region, other type detection region)
122 close detection region
123 electrostatic detection region
140 door knob sensor
141 sensor control unit
142 delay generation unit
143 RF unit
144A transmission antenna
144B reception antenna
145 detection circuit
146 electrode
151 reference wave signal output portion
152 signal processing portion
153 detection control portion
154 signal processing portion
161 electric wave sensor
162 electrostatic capacity sensor
201 ECU
211 sensor power supply unit
231 electric wave sensor
231A power supply unit
232 electrostatic capacity sensor
232A power supply unit
250 other type detection region
251 door knob sensor
261 sensor control unit
262 electrode
263 other type sensor detection unit
271 electrostatic capacity change converting portion
272 other type sensor detection determining portion
273 electrostatic sensor detection determining portion
281 electrostatic capacity sensor
282 other type sensor

DETAILED DESCRIPTION

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The conventional passive entry system will be described to facilitate an understanding of a first embodiment of the present embodiment.

The conventional passive entry system (see e.g., Japanese Unexamined Patent Publication No. 2003-20835) is mounted with a sensor for recognizing the approach and the contact of a human hand that opens and closes the door of the vehicle to unlock/lock the door of the vehicle.

Such sensor includes an electrostatic capacity sensor, a Piezo, and the like.

Here, Piezo refers to a sensor that generates a voltage according to the magnitude of the applied pressure (convert mechanical energy caused by vibration at the time of opening and closing to electric energy), and outputs such a voltage as a detection signal.

If the electric wave sensor is used as the sensor, the approach of the hand to about 10 cm to the outer handle can be detected.

In the electrostatic capacity sensor and Piezo sensor for detecting the hand at the vicinity of the outer handle, a false operation is few since there is a need to bring the hand close by the intention of the user. However, since time is required from the detection of the hand by the sensor until the start of the control of the unlocking of the door lock and the completion of unlocking, the unlocking may not yet be completed when the user pulls the outer handle, and the door may not be opened.

If the electric wave sensor is used, locking may be carried out against the intention of the user since the detection distance is long.

The passive entry system that realizes the unlocking and the locking of the door of the vehicle that is easy to use for a user is the passive entry system of the first embodiment described below.

FIG. 1 is a block diagram showing a configuration example of the passive entry system.

In the example of FIG. 1, the passive entry system is configured to include a portable electronic key 11 to a motor 15.

The portable electronic key 11 is primarily carried around by the user driving the vehicle, and is used to perform locking/unlocking of the door of the vehicle, starting of an engine of the vehicle, and the like.

In other words, an ECU (Electronic Control Unit) 12 mounted on the vehicle performs authentication by wirelessly communicating with the portable electronic key 11, and controls the operation of locking/unlocking of the door of the vehicle, starting of an engine of the vehicle, and the like when the authentication is successful.

In the example of FIG. 1, the ECU 12 is configured to include an LF transmission unit 51, an UHF reception unit 53, and a control unit 55.

The control unit 55 of the ECU 12 is connected with a door knob sensor 13 and an engine startup permitting switch 14

(hereinafter referred to as an engine startup permitting SW 14 in accordance with the description in FIG. 1).

Figure 2:
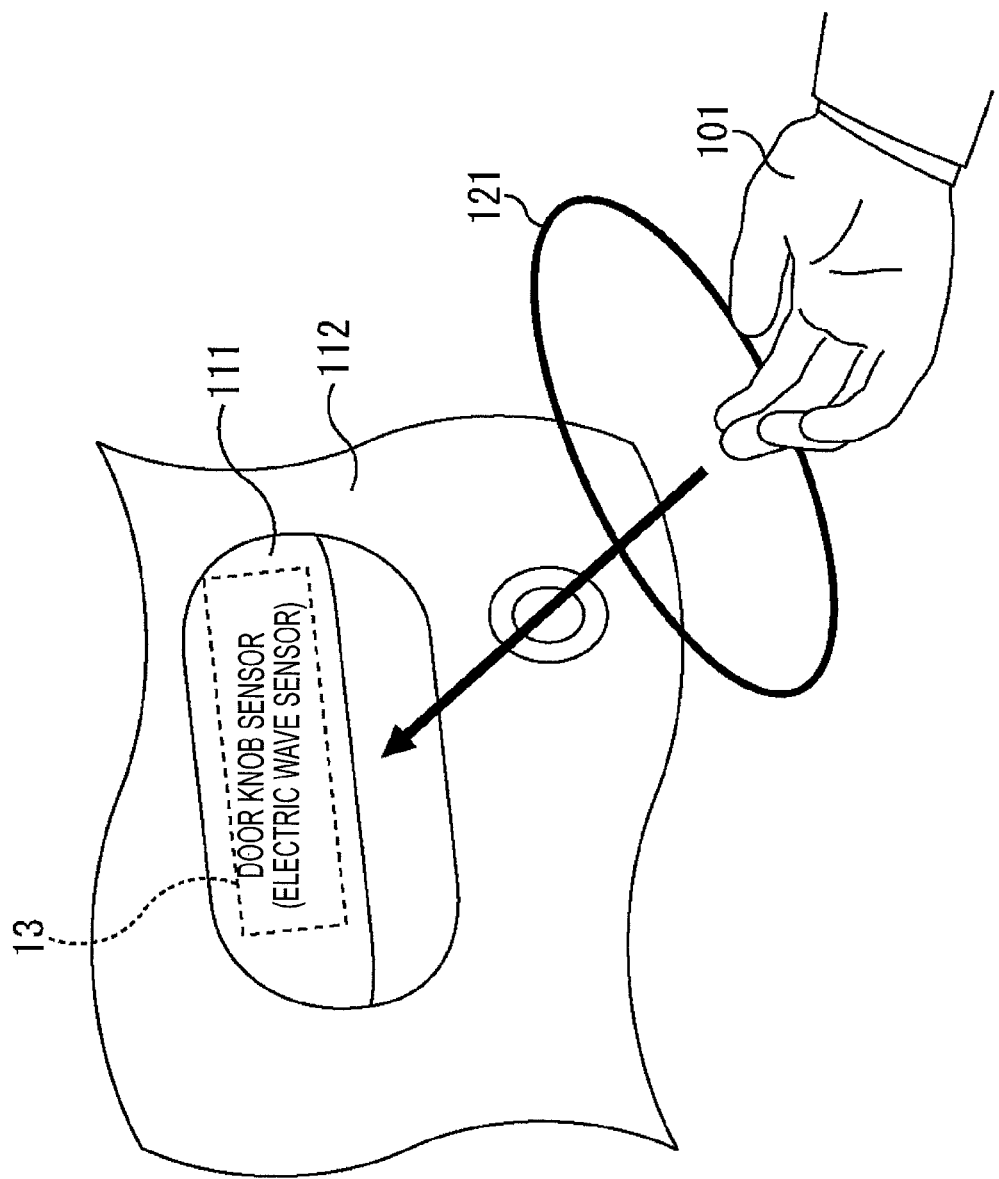
FIG. 2 is a view explaining one example of an unlocking process by the passive entry system of FIG. 1.

As shown in FIG. 2, the door knob sensor 13 is configured as an electric wave sensor, and is installed on an inner side of an outer handle 11 of a door 112 or in the door. The door knob sensor 13 serving as the electric wave sensor can detect that the user is attempting to open/close the door 112 before the user contacts with the door 112 based on distance information from the outer handle 111 to the hand 101 of the user (driver and the like).

The door knob sensor 13 serving as the electric wave sensor is configured so that one or more detection regions can be set. The distance width of a predetermined detection region is not particularly limited, and can be freely set by the discretion of the designer and the like. For instance, the detection distance in which the distance width is substantially zero, that is, one point may be adopted as the detection region, or the detection region in which the distance width is finite, that is, a range of greater than or equal to a first distance and smaller than or equal to a second distance may be adopted for the detection region.

Figure 3:
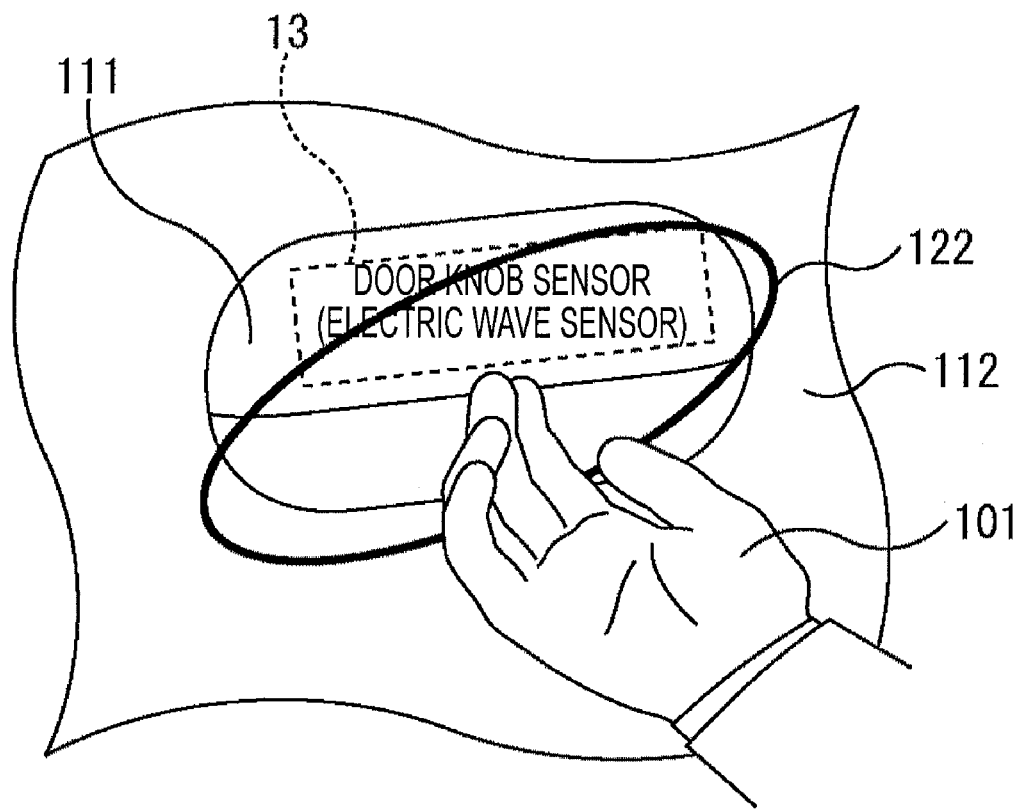
FIG. 3 is a view explaining one example of a locking process by the passive entry system of FIG. 1.

In the present embodiment, for example, the door knob sensor 13 serving as the electric wave sensor is configured to be able to switch and set the detection region 121 of FIG. 2 and the detection region 122 of FIG. 3 for the detection region. In other words, as apparent from comparing FIG. 2 and FIG. 3, the detection region 121 of FIG. 2 is a region farther away than the detection region 122 of FIG. 3 with respect to the door 112. Specifically, the detection region 122 of FIG. 3 is a region spaced apart by a distance of an extent the hand 101 almost contact with the door 112 such as about 0 cm to 1 cm, whereas the detection region 121 of FIG. 2 is a region spaced apart by a distance the hand 101 does not contact with the door 112 such as about 5 cm to 10 cm. The detection region 121 of FIG. 2 is hereinafter referred to as a far detection region 121, and the detection region 122 of FIG. 3 is hereinafter referred to as a close detection region 122.

The control of the unlocking and the locking of the door 112 as described then can be carried out. The main body in the control operation is not particularly limited, but is the control unit 55 of the ECU 12 in FIG. 1 in the present embodiment.

As shown in FIG. 2, in the unlocking control, the door knob sensor 13 serving as the electric wave sensor outputs a signal (hereinafter referred to as an activation signal) indicating that the hand 101 is detected to the control unit 55 of the ECU 12 when detecting the hand 101 approaching the door 112 in the far detection region 121, that is, before contacting with the door 112.

The control unit 55 performs a control of unlocking the door 112 with the activation signal as a trigger. Specifically, a motor 15 is connected to the control unit 55 of the ECU 12. The motor 15 is a motor, which is a drive source of a lock device of the door 112 of the vehicle, that is, a door lock actuator. The control unit 55 thus drives the motor 15 to unlock the door 112.

However, the control unit 55 cannot recognize whether the detected hand 101 is the hand of a person with legitimate authority to open and close the door 112 or a hand of a person without authority with simply the detection result of the door knob sensor 13. If the door 112 is unlocked without such recognition, there may be security concerns. In the present embodiment, the control unit 55 performs an authentication process with respect to the person with the detected hand 101, and drives the motor 15 to unlock the door 112 only after the authentication is successful. The details of the authentication process will be described later.

The locking control is executed as shown in FIG. 3, as opposed to the unlocking control of FIG. 2.

As shown in FIG. 3, in the locking control, the door knob sensor 13 serving as the electric wave sensor outputs the activation signal to the control unit 55 of the ECU 12 when detecting the hand 101 approaching the door 112 in the close detection region 122, that is, at the stage of substantially contacting with the door 112.

The control unit 55 performs a control of locking the door 112 with the activation signal as a trigger. Specifically, the control unit 55 performs the authentication process (authentication process will be described later), and drives the motor 15 to lock the door 112 when the authentication is successful.

The unlocking control of FIG. 2 and the locking control of FIG. 3 will be described again from the standpoint of a user operation.

When desiring to open the door 112, the user simply needs to bring the hand 101 closer to the outer handle 111 without particularly being conscious of unlocking the door 112, as shown in FIG. 2. This is because the door 112 will be unlocked at the time point the hand 101 passes the far detection region 121. Therefore, the door 112 is already unlocked (unlocked state is maintained) at the time point the hand 101 actually grips (contacts with) the outer handle 111, so that the user can immediately open the door 112.

When desiring to lock the door 112 after closing, the user simply needs to lightly bring the hand 101 into contact with the outer handle 11, as shown in FIG. 3. This is because the door 112 will be locked at the time point the hand 101 passes the close detection region 122. The detection region of the door knob sensor 13 for outputting the activation signal that acts as a trigger in locking is set as the close detection region 122 rather than the far detection region 121 because the operation of locking the door 112 is suitably performed with the conscious of the user in terms of safety, as opposed to unlocking, where the operation of contacting with the outer handle 111, which is the operation performed with conscious, is an operation simpler than the prior art. In other words, since the locking operation is performed near the outer handle 111, the user can recognize that the locking operation is surely performed and the feeling insecurity whether locking is reliably performed can be resolved.

Returning to FIG. 1, the LG transmission unit 51 is connected to the control unit 55 capable of executing the control of the unlocking/locking of the door 112. The LF transmission unit 51 is in turn connected to an antenna 52. In other words, the LF transmission unit 51 transmits information provided from the control unit 55 such as "request" for authenticating the portable electronic key 11 from the antenna 52 in the form of LF (Low Frequency).

The UHF reception unit 53 is also connected to the control unit 55 of the ECU 12. The UHF reception unit 53 is in turn connected to the antenna 54. In other words, the UHF reception unit 53 receives the information transmitted from the portable electronic key 11 in the form of UHF (Ultra High Frequency) such as "answer" with respect to the "request" through the antenna 54, and provides the same to the control unit 55 after converting to an appropriate form.

The term "request" used in the specification is a wireless signal transmitted from a fixed wireless communication device (ECU 12 in the present embodiment), and having a function of causing a portable wireless communication device (portable electronic key 11 in the present embodiment) existing within a communication range to transmit a signal on the basis of the portable wireless communication device receiving the "request".

The term "answer" used in the specification is a wireless signal transmitted from the portable wireless communication device on the basis of the reception of the "request". The function of the "answer" may be a function of simply indicating reception, or may request or cause the fixed wireless communication device to implement some kind of operation. In addition, the "answer" may contain an ID of each wireless communication device, positional information of the portable wireless communication device, a code for obtaining the operation on the vehicle and the fixed wireless communication device, and the like. In the present embodiment, assume that the "answer" contains an ID code used in the authentication process, as hereinafter described.

In other words, in the present embodiment, the authentication process is executed when the "request" and the "answer" are exchanged, and the door 112 is unlocked/locked when the authentication is successful in the unlocking/locking control of the door 112. Specific examples of the series of processes will be described later with reference to FIG. 4.

Although not shown, the control unit 55 is configured to include a storage portion for storing various types of information, a microcomputer for performing the control of the entire ECU 12 and the necessary information processing, and the like. The storage portion (not shown) may be an erasable programmable non-volatile memory, more specifically, an EEPROM (Electrically Erasable Programmable Read-only Memory).

The control unit 55 executes the unlocking/locking control process (hereinafter referred to as an unlocking/locking process) of the door 112 of the vehicle, the control process for starting the engine of the vehicle, and the like.

For instance, the control unit 55 transmits the "request" from the antenna 52 when the detection signal of the engine startup permitting SW 14 is input. When receiving the "answer" from the portable electronic key 11, and the ID code matches the code given to the person having legitimate driving authority, the engine startup permitting signal is output. The engine of the vehicle then starts.

For instance, the control unit 55 performs the control of switching the setting of the detection region of the door knob sensor 13 serving as the electric wave sensor. In the present embodiment, the control unit 55 sets the far detection region 121 of FIG. 2 when performing the unlocking process of the door and sets the close detection region 122 of FIG. 3 when performing the locking process of the door in the unlocking/locking process. Other contents of the unlocking/locking process will be hereinafter described with reference to FIG. 4.

The portable electronic key 11 in the example of FIG. 1 is configured to include an antenna 71 to a control unit 75 with respect to the ECU 12.

An LF reception unit 72 converts an LF received by an antenna 71 to information of an appropriate mode, and provides the same to the control unit 75. The information received in the form of LF by the antenna 71 includes the "request" from the ECU 12.

An UHF transmission unit 73 transmits the information provided from the control unit 75 from an antenna 74 in the form of UHF. The information provided from the control unit 75 includes the "answer" with respect to the ECU 12.

Although not shown, the control unit 75 is configured to include a storage portion for storing various types of information, a microcomputer for performing the control of the entire portable electronic key 11 and the necessary information processing, and the like. The storage portion (not shown) may be an erasable programmable non-volatile memory, more specifically, an EEPROM (Electrically Erasable Programmable Read-only Memory).

The control unit 75 generates the "answer" including its ID code with respect to the "request" from the ECU 12, and provides the same to the UHF transmission unit 73.

One example of the unlocking/locking process of the processes executed by the ECU 12, the door knob sensor 13, and the like of FIG. 1 will now be described with reference to the flowchart of FIG. 4.

In step S1, the ECU 12 determines whether or not the door 112 is in the locked state.

If the door 112 is in the locked state, the process of step S1 is determined as YES, and the unlocking process of the door 112 is executed in a series of processes of steps S2 to S8.

In other words, in step S2, the door knob sensor 13 sets the detection region to the far detection region 121 of FIG. 2 based on the control of the ECU 12.

In step S3, the door knob sensor 13 determines whether or not the hand 101 is detected.

As shown in FIG. 2, the door knob sensor 13 does not detect the hand 101 unless the hand 101 is in the far detection region 121. Therefore, in such a case, the process of step S3 is determined as NO, and the process proceeds to step S16. The processes after step S16 will be described later.

As shown in FIG. 2, when the user approaches the hand 101 to the outer handle 111 of the door 112 to open the door 112, the door knob sensor 13 detects the hand 101 at the stage the hand 101 enters the far detection region 121. In such a case, the process of step S3 is determined as YES, and the process proceeds to step S4.

In step S4, the door knob sensor 13 determines whether or not in the normal mode.

The normal mode refers to a mode in which the prohibit mode is not set in the present embodiment. The prohibit mode is a mode when the frequency on the presence of detection in a short period of time that is not possible in the approach of the human hand 101 reaches the defined degree, in which case the detection is invalidated. In other words, when the hand 101 is detected, the normal mode and the prohibit mode are provided to guarantee the legitimateness of the detection.

Therefore, the mode is the prohibit mode when the detection of the hand 101 in the process of step S3 (YES) is determined as not legitimate. The process of step S4 is determined as NO, and the process proceeds to step S16. The processes after step S16 will be described later.

The mode is the normal mode when the detection of the hand 101 in the process of step S3 (YES) is determined as legitimate. The door knob sensor 13 determines YES in the process of step S4, and outputs the activation signal to the ECU 12 in step S5.

In step S6, the ECU 12 transmits the "request" to the portable electronic key 11.

In step S7, the ECU 12 receives the "answer" from the portable electronic key 11, and determines whether or not the ID codes match.

If the "answer" itself is not transmitted from the portable electronic key 11, or if the "answer" itself is transmitted and received by the ECU 12 but the ID code is not contained therein or the contained ID code is different from the code given to the person having legitimate driving authority, the process of step S7 is determined as NO, and the process proceeds to step S16. The processes after step S16 will be described later.

If the "answer" transmitted from the portable electronic key 11 is received by the ECU 12 and the ID code matches the code given to the person having legitimate driving authority, the process of step S7 is determined as YES, and the process proceeds to step S8.

In other words, the authentication process is performed in the processes of steps S6 and S7, where the process of step S7 is determined as NO when the authentication process fails and the processes after step S16 are executed. When the authentication process is successful, the process of step S7 is determined as YES, and the process proceeds to step S8.

In step S8, the ECU 12 controls the motor 15 and unlocks the door 112.

In step S16, the ECU 12 determines whether or not the termination of the process is instructed.

If determined that the termination of the process is not yet instructed in step S16, the process returns to step S1, and the subsequent processes are repeated.

If determined that the termination of the process is instructed in step S16, the unlocking/locking process is terminated.

The unlocking process of the unlocking/locking process has been described above.

The locking process of the unlocking/locking process has be describe next.

When performing the locking process, the door 112 is in the unlocked state, and thus the process of step S1 is determined as NO, and the process proceeds to step S9.

In step S9, the door knob sensor 13 sets the detection region to the close detection region 122 of FIG. 3 based on the control of the ECU 12.

In step S10, the door knob sensor 13 determines whether or not the hand 101 is detected.

As shown in FIG. 3, the door knob sensor 13 does not detect the hand 101 unless the hand 101 enters the close detection region 122, that is, the hand 101 approaches the outer handle 111 of the door 112 to an extent of contacting with the outer handle 111. Therefore, in such a case, the process of step S10 is determined as NO, and the process proceeds to step S16.

As shown in FIG. 3, when the user more or less contacts its hand 101 with the outer handle 111 of the door 112 to lock the door 112, the door knob sensor 13 detects the hand 101 since the hand 101 enters the close detection region 122. In such a case, the process of step S10 is determined as YES, and the process proceeds to step S11.

In step S11, the door knob sensor 13 determines whether or not in the normal mode.

The mode is the prohibit mode when the detection of the hand 101 in the process of step S10 (YES) is determined as not legitimate, and the process of step S11 is determined as NO and the process proceeds to step S16.

The mode is the normal mode when the detection of the hand 101 in the process of step S10 (YES) is determined as legitimate. The door knob sensor 13 determines YES in the process of step S11, and outputs the activation signal to the ECU 12 in step S12.

In step S13, the ECU 12 transmits the "request" to the portable electronic key 11.

In step S14, the ECU 12 receives the "answer" from the portable electronic key 11, and determines whether or not the ID codes match.

If the "answer" itself is not transmitted from the portable electronic key 11, or if the "answer" itself is transmitted and received by the ECU 12 but the ID code is not contained therein or the contained ID code is different from the code given to the person having legitimate driving authority, the process of step S14 is determined as NO, and the process proceeds to step S16.

If the "answer" transmitted from the portable electronic key 11 is received by the ECU 12 and the ID code matches the code given to the person having legitimate driving authority, the process of step S14 is determined as YES, and the process proceeds to step S15.

In other words, the authentication process is performed in the processes of steps S13 and S14, where the process of step S14 is determined as NO when the authentication process fails and the processes after step S16 are executed. When the authentication process is successful, the process of step S14 is determined as YES, and the process proceeds to step S15.

In step S15, the ECU 12 controls the motor 15 and locks the door 112. Thereafter, the process proceeds to step S16.

An example applied with the present invention with respect to the unlocking/locking control of the door 112 using the door sensor 13 serving as the electric wave sensor has been described above. However, the present invention is not particularly limited, and various embodiments may be adopted.

For instance, if the door knob sensor 13 can detect the movement of the hand 101, that is, output a signal that changes by such movement, the ECU 12 and the like can determine the intention of the user to unlock or lock based on the signal that changes by the movement of the hand 101. The ECU 12 and the like can also perform the unlocking/locking control of the door 112 based on such determination.

For instance, the ECU 12 and the like can present to the user that the unlocking/locking of the door 112 has been performed as part of the unlocking/locking control of the door 112. The presenting method in this case is not particularly limited, and sound, light, vibration, and the like, may be utilized.

The door knob sensor 13 does not need to be configured by the electric wave sensor, and merely needs to have a function of varying the detection region.

Furthermore, the door knob sensor 13 does not particularly need to be configured by one sensor alone, and may be configured by combining two or more sensors.

Figure 5:
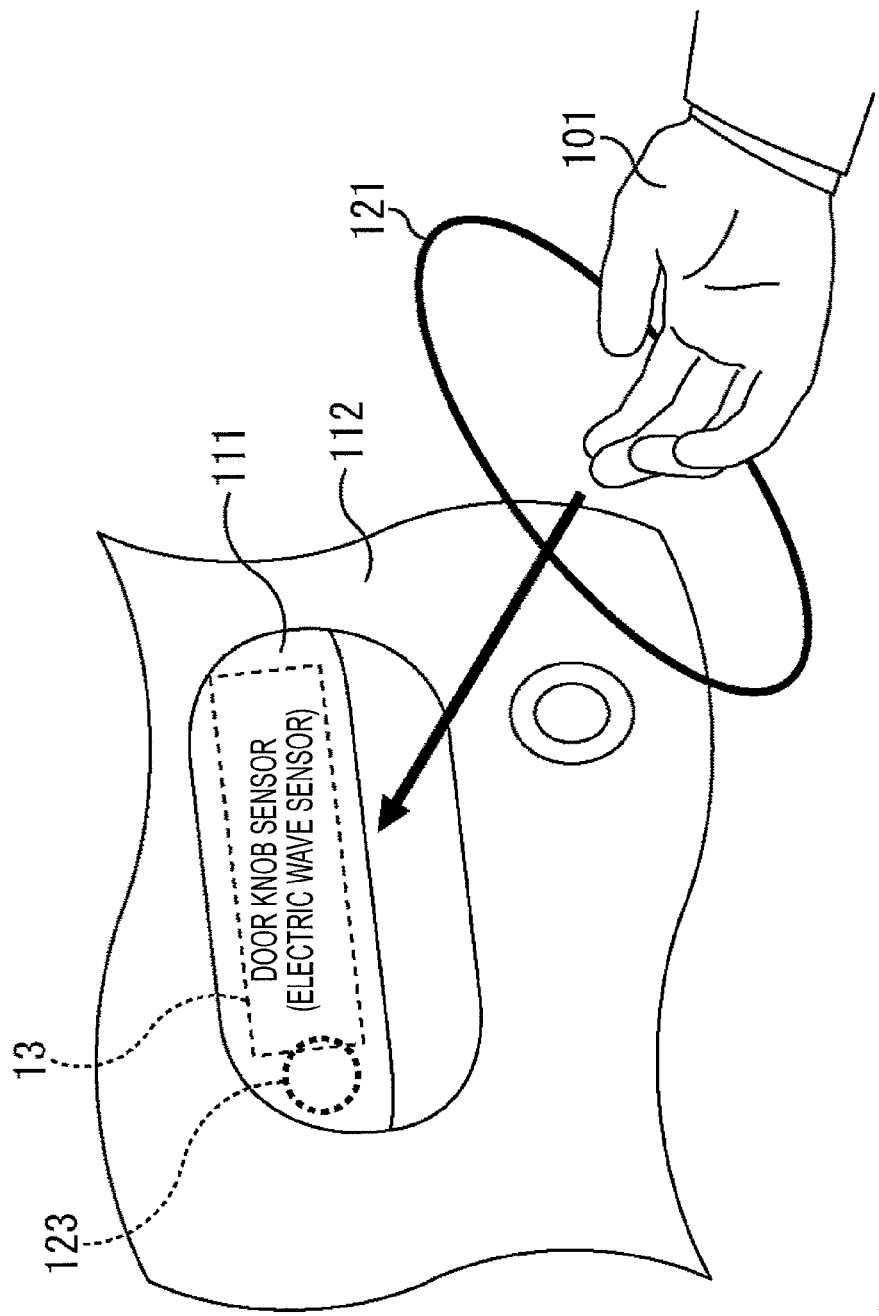
FIG. 5 is a view showing one example of another configuration of a door knob sensor of FIG. 1.

Specifically, as shown in FIG. 5, the door knob sensor 13 may be configured by a combination of the electrostatic capacity sensor and the electric wave sensor.

In FIG. 5, the corresponding reference numerals are denoted to the areas corresponding to FIG. 2, and the description on such areas will be omitted as such areas have been described in FIG. 2. A region 123 surrounded with a dotted line shows the detection region of the electrostatic capacity sensor. The region 123 is hereinafter referred to as an electrostatic detection region 123.

Figure 4:
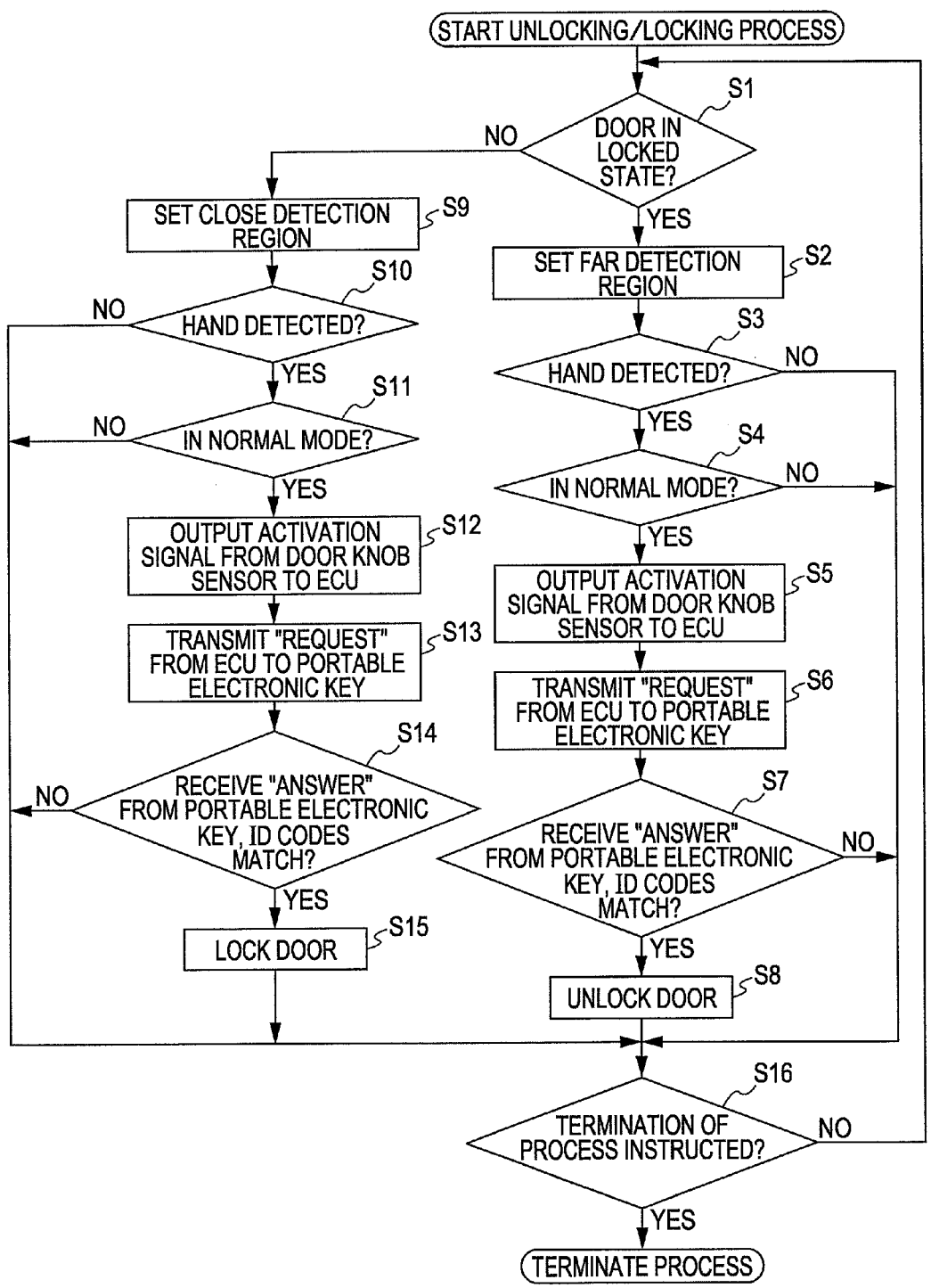
FIG. 4 is a flowchart explaining one example of an unlocking/locking process by the passive entry system of FIG. 1.

In this case, the electrostatic detection region 123 is adopted in place of the close detection region 122 of FIG. 3, and the process of "setting to the electrostatic detection region" is adopted for the process of step S9 of FIG. 4, so that the unlocking/locking process of FIG. 4 can be implemented in a completely similar manner.

The door knob sensor 13 including a combination of the electrostatic capacity sensor and the electric wave sensor may be used in the following application.

In other words, the door knob sensor 13 of FIG. 5 is further combined with the electric wave sensor with respect to the conventional door knob sensor including only the electrostatic capacity sensor to compensate for the drawbacks of the conventional door knob sensor.

The drawbacks of the conventional door knob sensor including only the electrostatic capacity sensor are as follows.

As apparent from the electrostatic detection region 123 of FIG. 5, the electrostatic capacity sensor has a drawback in that the detection range is very narrow (measurement distance is very short), and the hand 101 cannot be detected until the hand 101 is contacting with or substantially contacting with the outer handle 11. If the unlocking and the locking of the door 112 are controlled by the electrostatic capacity sensor having such drawbacks, the user performing the operation needs to wait until the unlocking or the locking is completed.

Furthermore, the electrostatic capacity sensor has a drawback in that calibration is necessary on a constant basis, and the detection of the hand 101 becomes difficult if the timing of calibration is bad.

The drawbacks of the electrostatic capacity sensor can be compensated by the electric wave sensor in the door knob sensor 13 having the configuration of FIG. 5.

In other words, the electric wave sensor can detect the hand 101 approaching the outer handle 11 before the hand contacts with the outer handle 111, specifically, at the time point the hand 101 has passed the far detection region 121 in the door knob sensor 13 of FIG. 5. The hand 101 approaching the door 112 can be detected without waiting the person of the hand 101, that is, the person opening and closing the door 112 by utilizing the detection result of the electric wave sensor in the detection of the electrostatic capacity sensor. Furthermore, this can also be used as an FS function.

The detection of the hand 101 at the far part of the outer handle 111 can be performed by the electric wave sensor, and the detection information of the hand 101 by the electric wave sensor can be utilized as the information for performing calibration of the electrostatic capacity sensor, whereby the false operation can be prevented.

The lock button, which is necessary in the prior art, is unnecessary since the electric wave sensor is arranged. Such effect is similarly achieved even in the door knob sensor 13 configured only from the electric wave sensor of FIG. 2 and FIG. 3.

A so-called dual function also can be realized, in other words, if one of the sensors does not react, the other sensor can take over the detection process. Furthermore, if one of the sensors does not react, this may be presented to the user. In this case, the detection process may be taken over or may not be performed at the relevant time point and may be left to the judgment of the user receiving the presentation.

The sensor made up of a combination of the electrostatic capacity sensor and the electric wave sensor is used as the door knob sensor 13 in the present embodiment, but is not particularly limited to the present embodiment, and may be applied to various applications.

In other words, a wide space can be detected by the electric wave sensor and a narrow space can be reliably detected by the electrostatic capacity sensor in the sensor made up of a combination of the electrostatic capacity sensor and the electric wave sensor. Applications that effectively utilize such effects exists in a great variety of technical fields.

A second embodiment of the present embodiment will now be described. The conventional passive entry system will be first described to facilitate an understanding of the second embodiment.

In a system using the individual detection control method of the conventional passive entry system, the same type of sensor is used for the sensors for unlocking and for locking, as described in the [Prior Art] section.

However, the requirements of unlocking and locking in the passive entry system differ. The requirement of unlocking is hereinafter referred to as an unlocking requirement and the requirement of locking is hereinafter referred to as a locking requirement.

Consider the unlocking requirement. Time until the unlocking is completed becomes long if the unlocking of the door starts after the user contacts with or comes close to the outer handle, and the user may need to wait until the door is unlocked. In some cases, the user may pull the outer handle before unlocking, and the unlocking may not make it on time. The unlocking requirement is appropriately to start the unlocking before the user contacts with or comes close to the outer handle. This is because a smoother unlocking of the door can be realized by satisfying the unlocking requirement since the time until the unlocking is completed after the user touches or comes close to the outer handle becomes short.

Consider the locking requirement. When locking with the recognition of the approach of the user, there is a possibility locking may be carried out against the intention of the user even when the user unintentionally approached. Even when the user recognizes that locking is performed with the approach, the door may not be locked as the approach of the user is not actually recognized. Either case is permissible. The locking requirement is appropriately to use a recognition that enables the intention of the user to be reliably transmitted. This is because the false operation caused by the unintended operation of the user can be prevented by satisfying the locking requirement, and consequently, the anti-stealing property can be enhanced.

Therefore, in the system using the individual detection control method of the conventional passive entry systems, the locking requirement can be satisfied but the unlocking requirement cannot be satisfied when a sensor for recognizing proximity and contact is used for the sensors for unlocking and for locking. If a sensor for recognizing approach is used for the sensors for unlocking and for locking, the unlocking requirement can be satisfied but the locking requirement cannot be satisfied.

The passive entry system that realizes the unlocking and the locking of the door of the vehicle that is easy to use for a user is the passive entry system of the second embodiment described below.

In the second embodiment, the unlocking requirement and the locking requirement can be satisfied by using a sensor for detecting the approach of the user for the unlocking sensor and using a sensor for detecting the proximity and the contact of the user for the locking sensor. Therefore, the door can be smoothly unlocked, and the convenience of the user can be enhanced.

Assume a sensor having a detection distance of few cm to over a ten cm for the sensor for detecting the approach. A sensor having a longer detection distance can be obviously used, but it should be noted that the possibility of false recognition increases if such sensor is used.

More specifically, the "electric wave sensor" is used for the sensor for detecting the approach of the user, and the "electrostatic capacity sensor" is used for the sensor for detecting the proximity and the contact of the user.

The electric wave sensor is suited for the unlocking sensor since the approach of the object can be recognized in a non-contact manner. The detection region of the electric wave sensor is a few cm to over ten cm.

The electrostatic capacity sensor is a sensor for acquiring the contact and the proximity of the user as a slight change in an electrostatic capacity. Thus, the user needs to reliably contact with or bring the hand close to the electrostatic capacity sensor. Therefore, the electrostatic capacity sensor is suited for reliably transmitting the intention of the user and for locking sensor.

The electric wave sensor and the electrostatic capacity sensor both do not include a movable part such as a mechanical switch, and excel in durability. Furthermore, either sensor does not need to perforate a hole or the like in a chassis or a resin portion around the outer handle, and thus has a characteristic in that the designability of the outer handle is not impaired.

The passive entry system of the second embodiment can commonly use the recognition unit of both sensors although the system is configured by two sensors, the electrostatic capacity sensor and the electric wave sensor, that have greatly different performance and function. Therefore, the electrostatic capacity sensor and the electric wave sensor can be configured as an integrated module (integrated module is the door knob sensor). The space thus can be effectively utilized, and the cost can be reduced. However, it should be noted that the electrostatic capacity sensor and the electric wave sensor do not need to be configured as an integrated module, and the electrostatic capacity sensor and the electric wave sensor may be installed at different locations.

Figure 6:
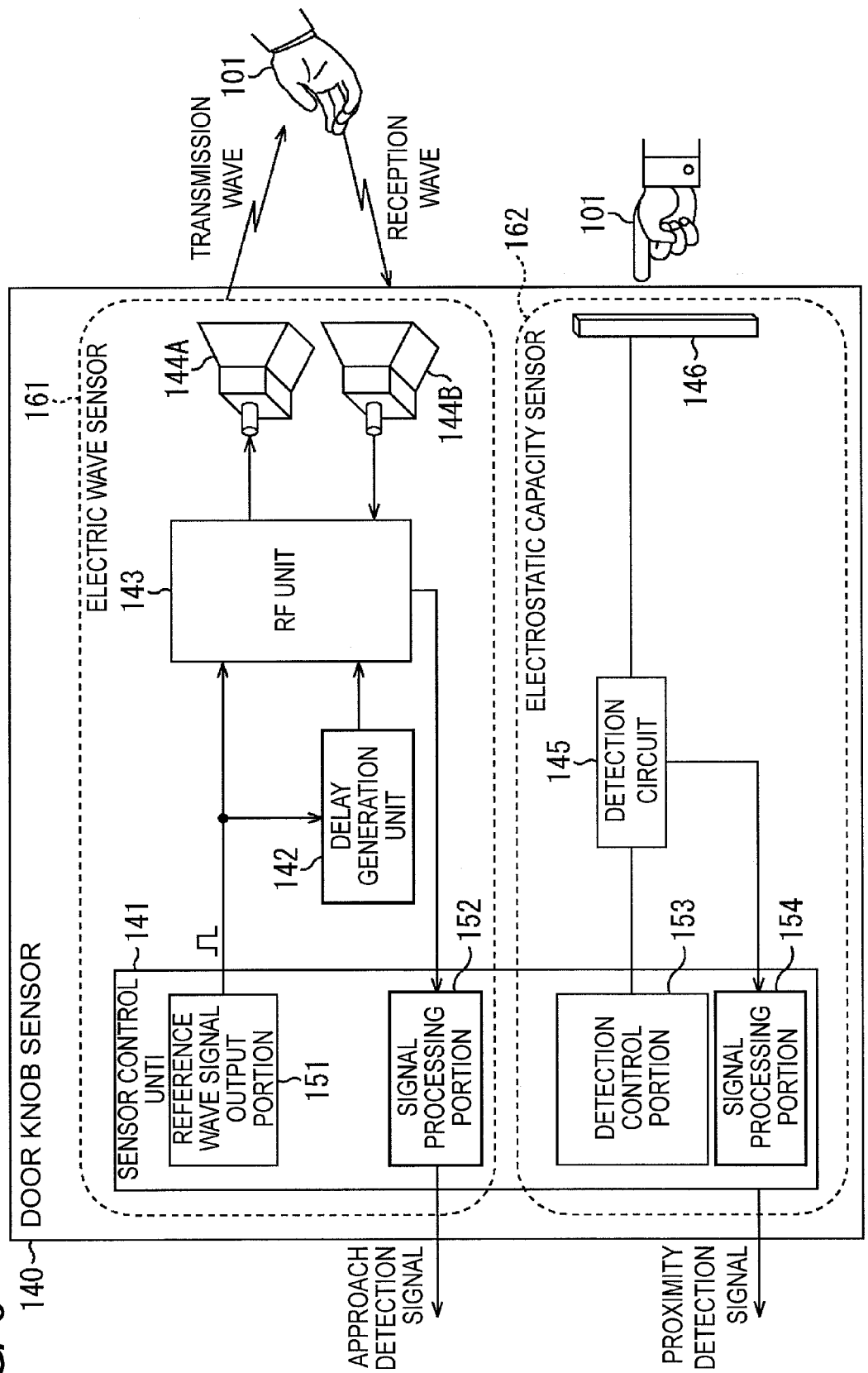
FIG. 6 is a view showing one example of another configuration of the door knob sensor of FIG. 1.

FIG. 6 is a block diagram showing one example of a configuration of a door knob sensor 140 including the electrostatic capacity sensor and the electric wave sensor configured as an integrated module.

The door knob sensor 140 is configured by a sensor control unit 141, a delay generation unit 142, an RF unit 143, a transmission antenna 144A, a reception antenna 144B, a detection circuit 145, and an electrode 146.

In other words, the portion of the electric wave sensor (hereinafter referred to as an electric wave sensor 161) of the door knob sensor 140 is configured by the sensor control unit 141 to the reception antenna 144B, and the portion of the electrostatic capacity sensor (hereinafter referred to as an electrostatic capacity sensor 162) of the door knob sensor 140 is configured by the sensor control unit 141, the detection circuit 145, and the electrode 146, from the standpoint that the door knob sensor 140 is a combination of the electrostatic capacity sensor and the electric wave sensor. The sensor control unit 141 serving as the recognition unit of the sensor is commonly used by the electric wave sensor 161 and the electrostatic capacity sensor 162.

The sensor control unit 141 includes a reference wave signal output portion 151 to a signal processing portion 154 as function blocks, as shown in FIG. 6. The reference wave signal output portion 151 and the signal processing portion 152 are blocks related to the electrostatic capacity sensor 162. Therefore, the electrostatic capacity sensor 162 can be recognized as being configured by the detection circuit 145, the electrode 146, the detection control portion 153, and the signal processing portion 154. The reference wave signal output portion 151 and the signal processing portion 152 are also blocks related to the electric wave sensor 161. Therefore, the electric wave sensor 161 can be recognized as being configured by the delay generation unit 142 to the reception antenna 144B, the reference wave signal output portion 151, and the signal processing portion 152.

The door knob sensor 140 is set with the detection region of the electrostatic capacity sensor 162 for the electrostatic detection region 123. The door knob sensor 140 is also set with the detection region of the electric wave sensor 161 for the far detection region 121. The detection region of the electric wave sensor 161 is hereinafter referred to as an electric wave detection region 121 for the sake of clarifying the comparison with the electrostatic detection region 123.

When an object, for example, the hand 101 enters the electric wave detection region 121, the electric wave sensor 161 receives the electric wave that returns when reflected by the object, and detects the object by the reception result. In other words, the reference wave signal output portion 151 of the electric wave sensor 161 generates a reference wave signal. The delay generation unit 142 delays the reference wave signal according to the electric wave detection region 121 set in the electric wave sensor 161. The RF unit 143 generates an RF signal from the reference wave signal. The transmission antenna 144A transmits the electric wave based on the RF signal. The reception antenna 144B receives the electric wave reflected and returned from the object, and provides the same to the RF unit 143 as an RF signal. The RF unit 143 mixes the RF signal and the reference signal of after the delay, and provides the resultant process signal to the signal processing portion 152. The process signal is a signal in which the amplitude level is within a predetermined range when an object exists in the electric wave detection region 121. The signal processing portion 152 detects the object when the amplitude level of the process signal is within a predetermined range, and outputs an approach detection signal indicating that the object is approaching to the ECU 12.

When the object to be detected, for example the hand 101, enters the electrostatic detection region 123, the electrostatic capacity sensor 162 detects the object by the change in the electrostatic capacity between the object to be detected and the electrode 146. In other words, the detection control portion 153 of the electrostatic capacity sensor 162 converts the electrostatic capacity between the object to be detected and the electrode 146 to a voltage by controlling the detection circuit 145. The signal processing portion 154 detects the object when the voltage after the conversion becomes greater than or equal to a predetermined value, and outputs a proximity detection signal indicating that the object is contacting with or is coming close to the ECU 12.

Figure 7:
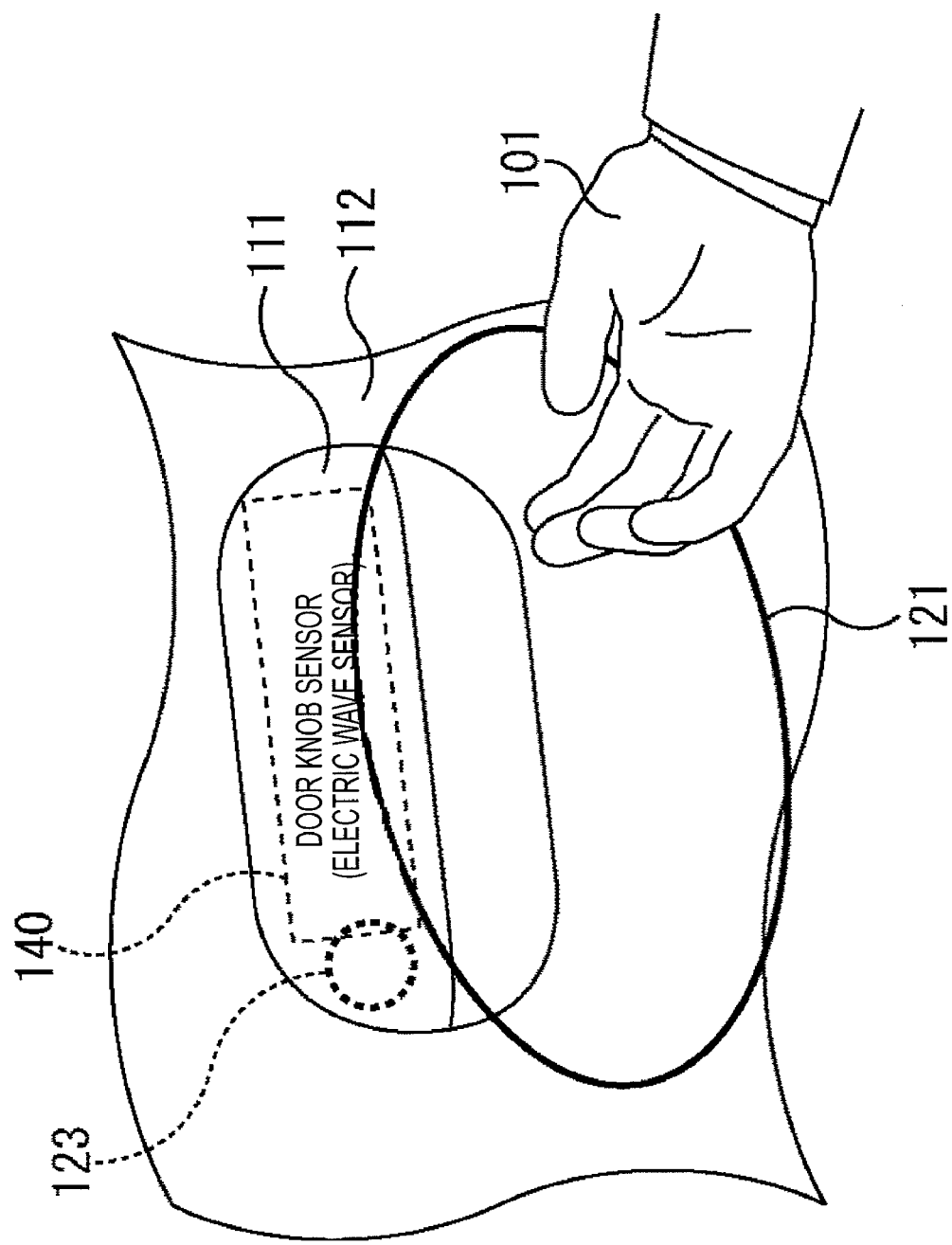
FIG. 7 is a view explaining the unlocking process by the passive entry system using the door knob sensor of FIG. 6.
Figure 8:
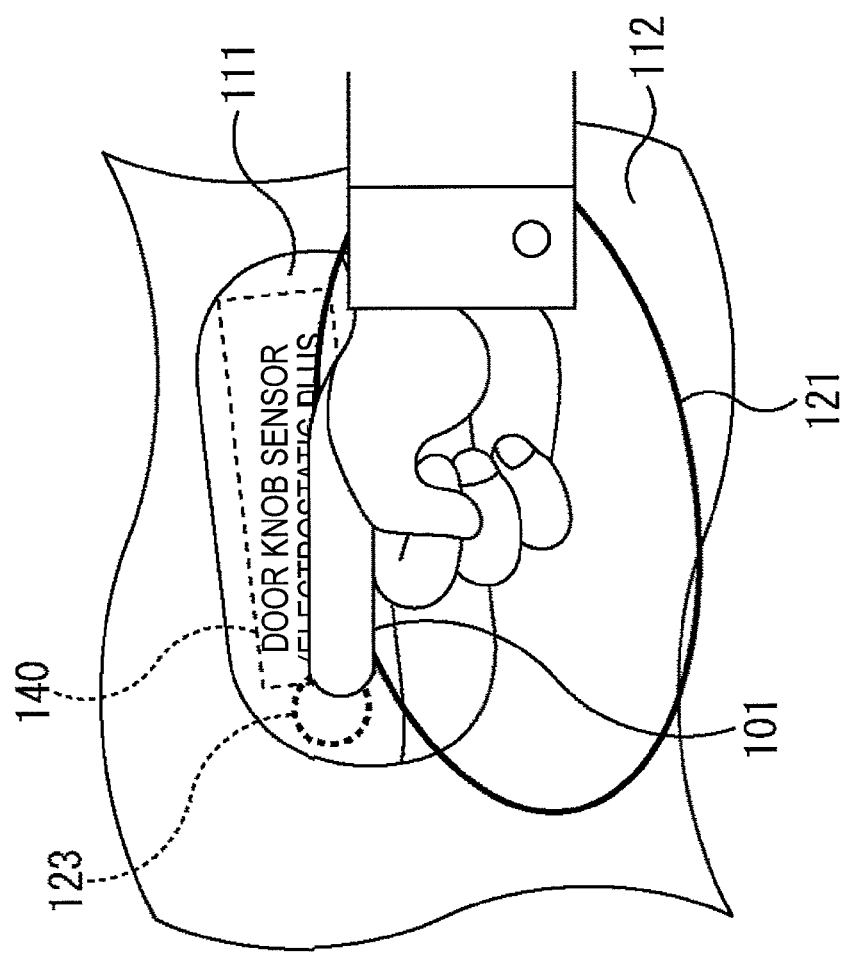
FIG. 8 is a view explaining the locking process by the passive entry system using the door knob sensor of FIG. 6.

The door knob sensor 140 having such a configuration is configured to include the electric wave detection region 121 and the electrostatic detection region 123 as shown in FIGS. 7 and 8. In FIG. 7 and FIG. 8, the user visually recognizes the door 112 from the near side in the direction of the door 112. In the example of FIG. 7 and FIG. 8, the electric wave detection region 121 is the region slightly below the near side of the outer handle 111, and the electrostatic detection region 123 is the region close to the portion on the left side of the portion where the door knob sensor 140 of the outer handle 111 is embedded, that is, to the portion where the electrode 146 is embedded (not shown).

The electrostatic capacity sensor has a merit in that the degree of freedom of design is high since the electrode can be embedded in the housing of the outer handle. However, some kind of devisal for having the user grip the position of the portion where the electrode is embedded such as a devisal of forming concavity and convexity or applying color to the portion where the electrode is embedded is required since the electrode itself is not exposed.

Figure 9:
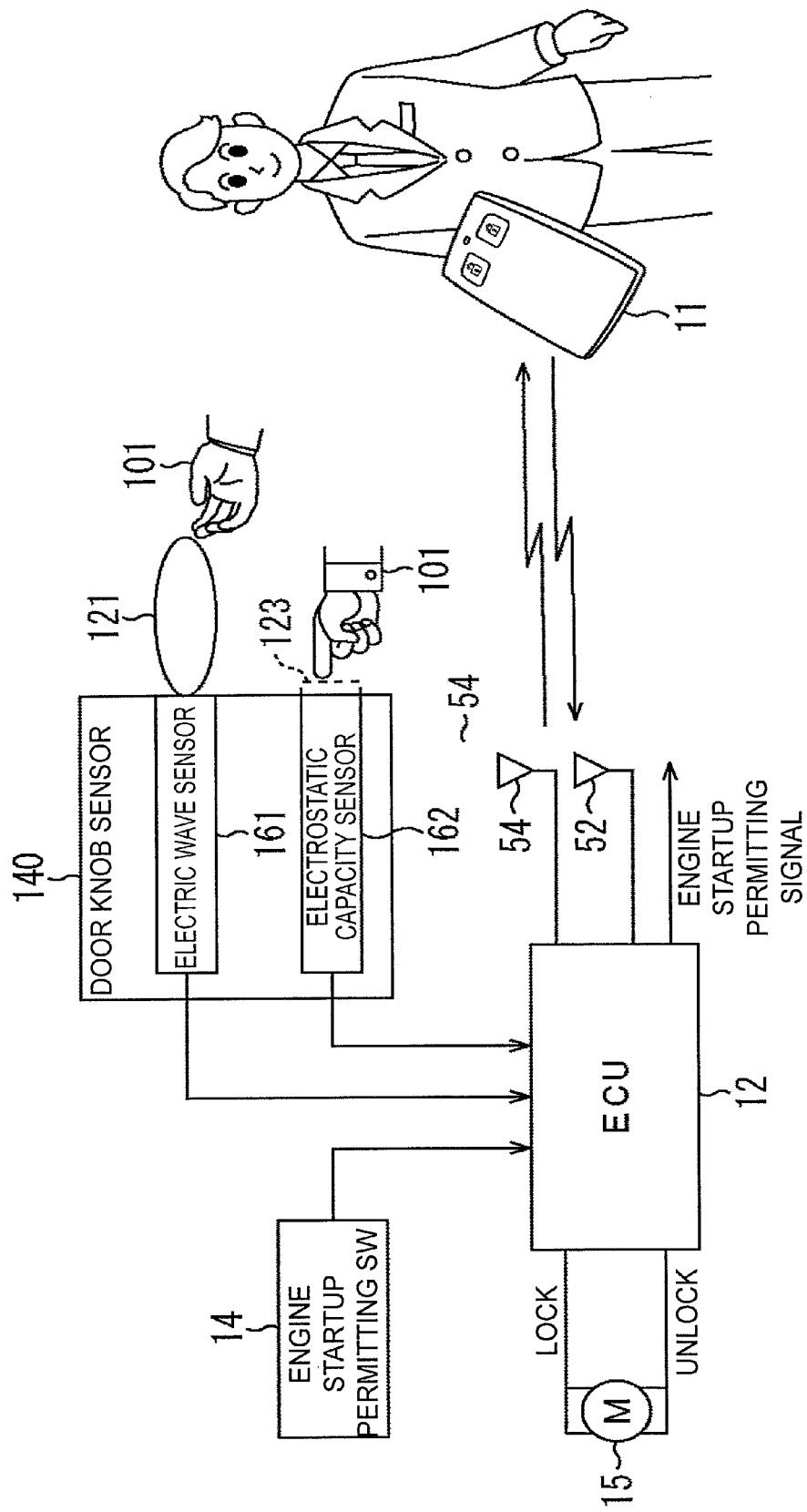
FIG. 9 is a block diagram showing one example of a configuration of the passive entry system using the door knob sensor of FIG. 6.

The configuration of the passive entry system using the door knob sensor 140 having the above configuration is shown in FIG. 9. In FIG. 9, the same reference numerals are denoted for the corresponding portions of FIG. 1, FIG. 7, and FIG. 8, and the description thereof will be omitted. In FIG. 9, the description on the internal blocks of the portable electronic key 11 will be omitted.

One example of the unlocking/locking process in the passive entry system of FIG. 9 will be described with reference to the flowchart of FIG. 10.

In step S31, the ECU 12 determines whether or not the door 112 is in the locked state.

If the door 112 is in the locked state, the process of step S31 is determined as YES, and the process proceeds to step S32. In step S32, the ECU 12 determines whether or not the approach of the object is detected.

As shown in FIG. 7, the electric wave sensor 161 does not detect the object unless the object, for example the hand 101, enters the electric wave detection region 121. Therefore, the process of step S32 is determined as NO in this case, and the process proceeds to step S37. The processes after step S37 will be hereinafter described.

On the contrary, as shown in FIG. 8, the electric wave sensor 161 detects the hand 101 at the stage the hand 101 enters the electric wave detection region 121 when the user brings the hand 101 close to the outer handle 111 of the door 112 to open the door 112. In such case, the process of step S32 is determined as YES, and the process proceeds to step S33.

In step S33, the electric wave sensor 161 outputs the approach detection signal to the ECU 12.

In step S34, the ECU 12 transmits the "request" to the portable electronic key 11, similar to step S6 of FIG. 4.

In step S35, the ECU 12 receives the "answer" from the portable electronic key 11, and determines whether or not the ID codes match, similar to step S7 of FIG. 4.

If the "answer" itself is not transmitted from the portable electronic key 11, or if the "answer" itself is transmitted and received by the ECU 12 but the ID code is not contained therein or the contained ID code is different from the code given to the person having legitimate driving authority, the process of step S35 is determined as NO, and the process proceeds to step S37. The processes after step S37 will be described later.

If the "answer" transmitted from the portable electronic key 11 is received by the ECU 12 and the ID code matches the code given to the person having legitimate driving authority, the process of step S35 is determined as YES, and the process proceeds to step S36.

In other words, the authentication process is performed in the processes of steps S34 and S35, where the process of step S35 is determined as NO when the authentication process fails and the processes after step S37 are executed. When the authentication process is successful, the process of step S35 is determined as YES, and the process proceeds to step S36.

In step S36, the ECU 12 controls the motor 15 and unlocks the door 112, similar to step S8 of FIG. 4.

In step S37, the ECU 12 determines whether or not the termination of the process is instructed.

If determined that the termination of the process is not yet instructed in step S37, the process returns to step S31, and the subsequent processes are repeated.

On the contrary, if determined that the termination of the process is instructed in step S37, the unlocking/locking process is terminated.

The unlocking process of the unlocking/locking process has been described above.

The locking process of the unlocking/locking process will now be described.

When performing the locking process, the door 112 is in the unlocked state, and thus the process of step S31 is determined as NO, and the process proceeds to step S38.

In step S38, the electrostatic capacity sensor 162 determines whether or not the proximity of the object (dielectric) is detected.

As shown in FIG. 8, the electrostatic capacity sensor 162 does not detect the object unless the object, for example the hand 101, enters the electrostatic detection region 123, that is, the object approaches to an extent of contacting with the portion of the electrostatic detection region 123 of the outer handle 111. Therefore, in such a case, the process of step S38 is determined as NO, and the process proceeds to step S39.

As shown in FIG. 7, when the user more or less contacts its hand 101 with the outer handle 111 of the door 112 to lock the door 112, the electrostatic capacity sensor 162 detects the hand 101 since the hand 101 enters the electrostatic detection region 123. In such a case, the process of step S38 is determined as YES, and the process proceeds to step S39.

In step S39, the electrostatic capacity sensor 162 outputs the proximity detection signal to the ECU 12.

In step S40, the ECU 12 transmits the "request" to the portable electronic key 11, similar to step S13 of FIG. 4.

In step S41, the ECU 12 receives the "answer" from the portable electronic key 11, and determines whether or not the ID codes match, similar to step S14 of FIG. 4.

If the "answer" itself is not transmitted from the portable electronic key 11, or if the "answer" itself is transmitted and received by the ECU 12 but the ID code is not contained therein or the contained ID code is different from the code given to the person having legitimate driving authority, the process of step S41 is determined as NO, and the process proceeds to step S37.

If the "answer" transmitted from the portable electronic key 11 is received by the ECU 12 and the ID code matches the code given to the person having legitimate driving authority, the process of step S41 is determined as YES, and the process proceeds to step S42.

In other words, the authentication process is performed in the processes of steps S40 and S41, where the process of step S41 is determined as NO when the authentication process fails and the processes after step S37 are executed. When the authentication process is successful, the process of step S41 is determined as YES, and the process proceeds to step S42.

In step S42, the ECU 12 controls the motor 15 and locks the door 112, similar to step S15 of FIG. 4. Thereafter, the process proceeds to step S37.

Figure 10:
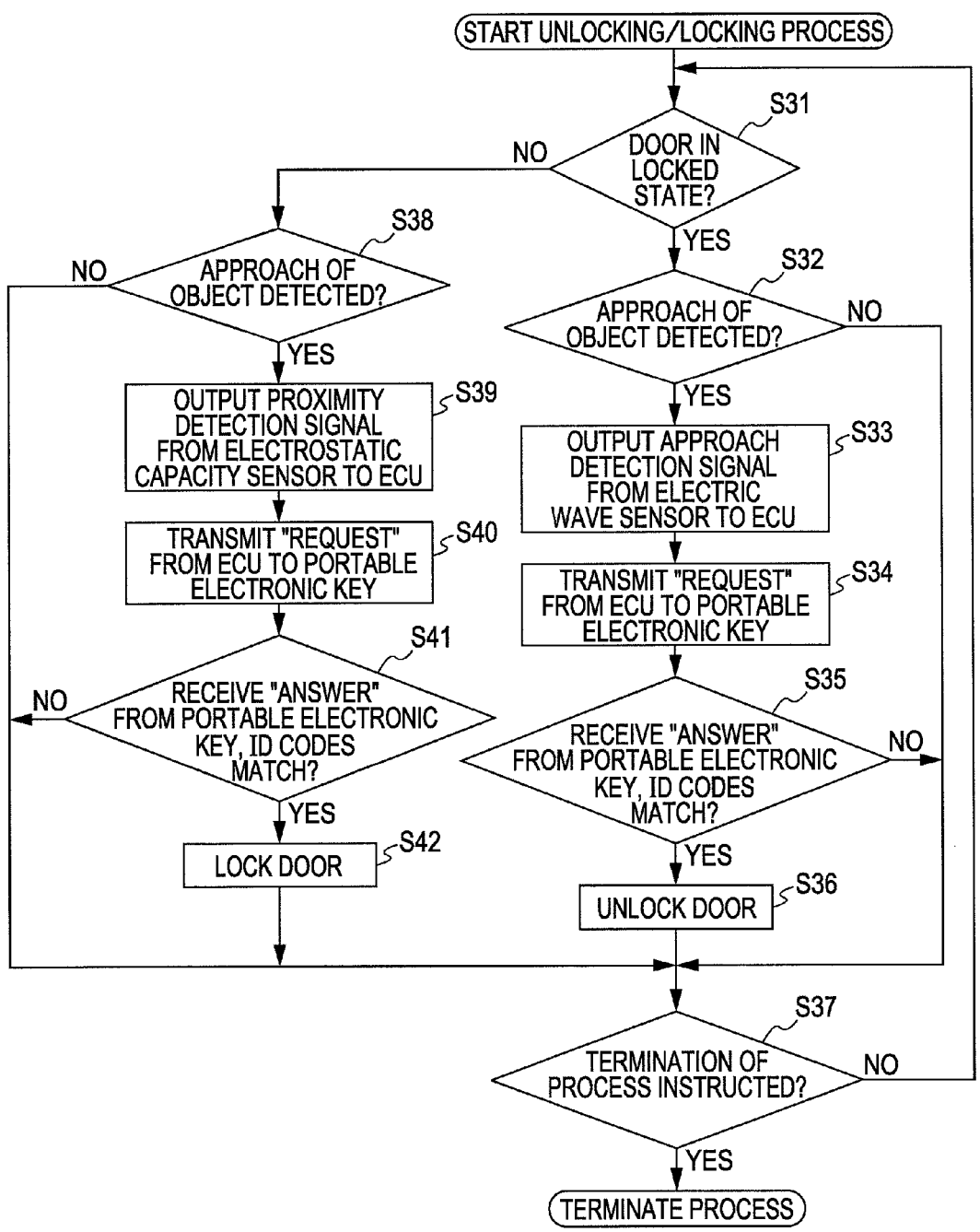
FIG. 10 is a flowchart explaining one example of the unlocking/locking process by the passive entry system of FIG. 9.

The unlocking/locking process of FIG. 10 has a possibility of causing a false operation. In other words, the hand 101 that entered the electrostatic detection region 123 to lock the door 112 may enter the electric wave detection region 121 when moving away from the door 112 after locking the door 112. In this case, the false operation of again unlocking the door 112 immediately after locking the door 112 occurs. Alternatively, the hand 101 that entered the electric wave detection region 121 to unlock the door 112 may also mistakenly enter the electrostatic detection region 123 after unlocking the door 112. In this case, the false operation of mistakenly locking the door 112 immediately after unlocking the door 112 occurs.

To prevent such a false operation, it is effective to perform a control of prohibiting the unlocking of the door for a predetermined period when the object is detected by the electrostatic capacity sensor 162, in addition to the unlocking/locking process of FIG. 10. Alternatively, it is effective to perform a control of prohibiting the locking of the door for a predetermined period when the object is detected by the electric wave sensor 161.

The unlocking/locking process of the case of performing the control of prohibiting the unlocking of the door for a predetermined period will be described with reference to FIG. 11 and FIG. 12, and the unlocking/locking process of the case performing the control of prohibiting the locking of the door for a predetermined period will be described with reference to FIG. 13 and FIG. 14.

First, another example of the unlocking/locking process in the passive entry system of FIG. 9 will be described with reference to the flowchart of FIG. 11.

Figure 11:
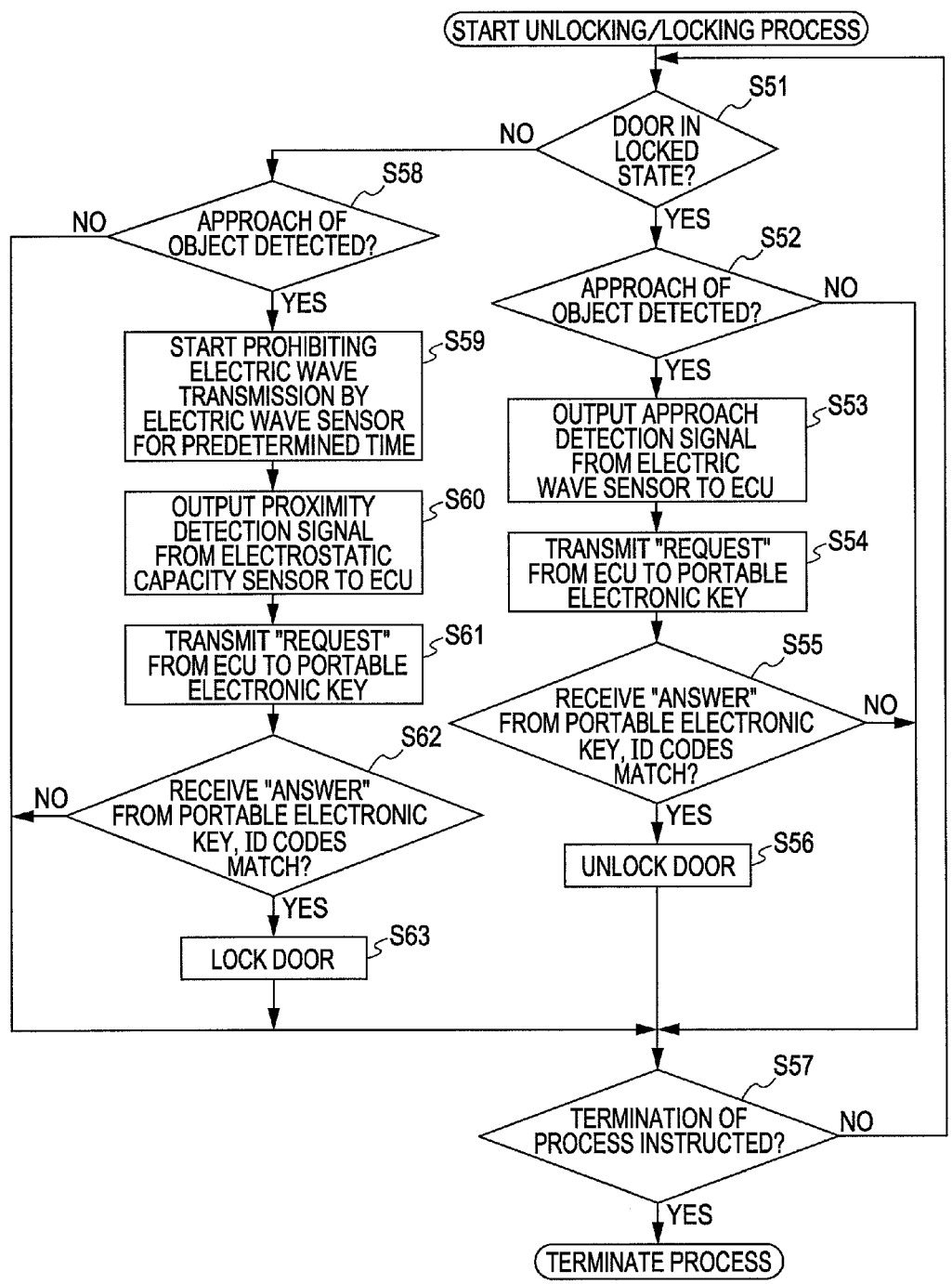
FIG. 11 is a flowchart explaining one example of the unlocking/locking process by the passive entry system of FIG. 9.

The processes of steps S51 to S58 of FIG. 11 are the same as the processes of steps S31 to S38 of FIG. 10, and the processes of steps S60 to S63 of FIG. 11 are the same as the processes of steps S39 to S42 of FIG. 10, and thus the respective description will be appropriately omitted.

After the proximity of the object is detected, the ECU 12 starts to prohibit the electric wave transmission by the electric wave sensor 161 for a predetermined time in step S59. The process thereafter proceeds to step S60.

The time of prohibiting the electric wave transmission is not particularly limited. For instance, the time of prohibiting the electric wave transmission may be arbitrarily specified by the user. However, the time of prohibiting the electric wave transmission is, for example, two seconds in the present embodiment.

After the processes of steps S60 and S61, the process proceeds to step S62. The determination is made as YES in step S62 and the process proceeds to step S63 if the user of the hand 101 has a legitimate driving authority, and the ID code of the "answer" from the portable electronic key 11 matches the code given to the person having legitimate driving authority. In step S63, the ECU 12 controls the motor 15 and locks the door 112. The process thereafter proceeds to step S57.

In step S57, determination is made as NO unless termination of the process is instructed, and the process proceeds to step S51. In this case, determination is made as YES in step S51 since the door is locked, and the process proceeds to step S52. The hand 101 sometimes enters the electric wave detection region 121 when moving away from the door 112 after locking the door 112. In this case as well, the electric wave sensor 161 cannot detect the approach of the object as long as within the predetermined time in which the electric wave transmission is prohibited, and thus determination is made as NO in step S52, the process proceeds to step S57, and the subsequent processes are repeated.

The unlocking of the door within a predetermined time after the proximity of the object is prohibited by prohibiting the electric wave transmission by the electric wave sensor 161 for a predetermined time.

Next, another example of the unlocking/locking process in the passive entry system of FIG. 9 will be described with reference to the flowchart of FIG. 12.

Figure 12:
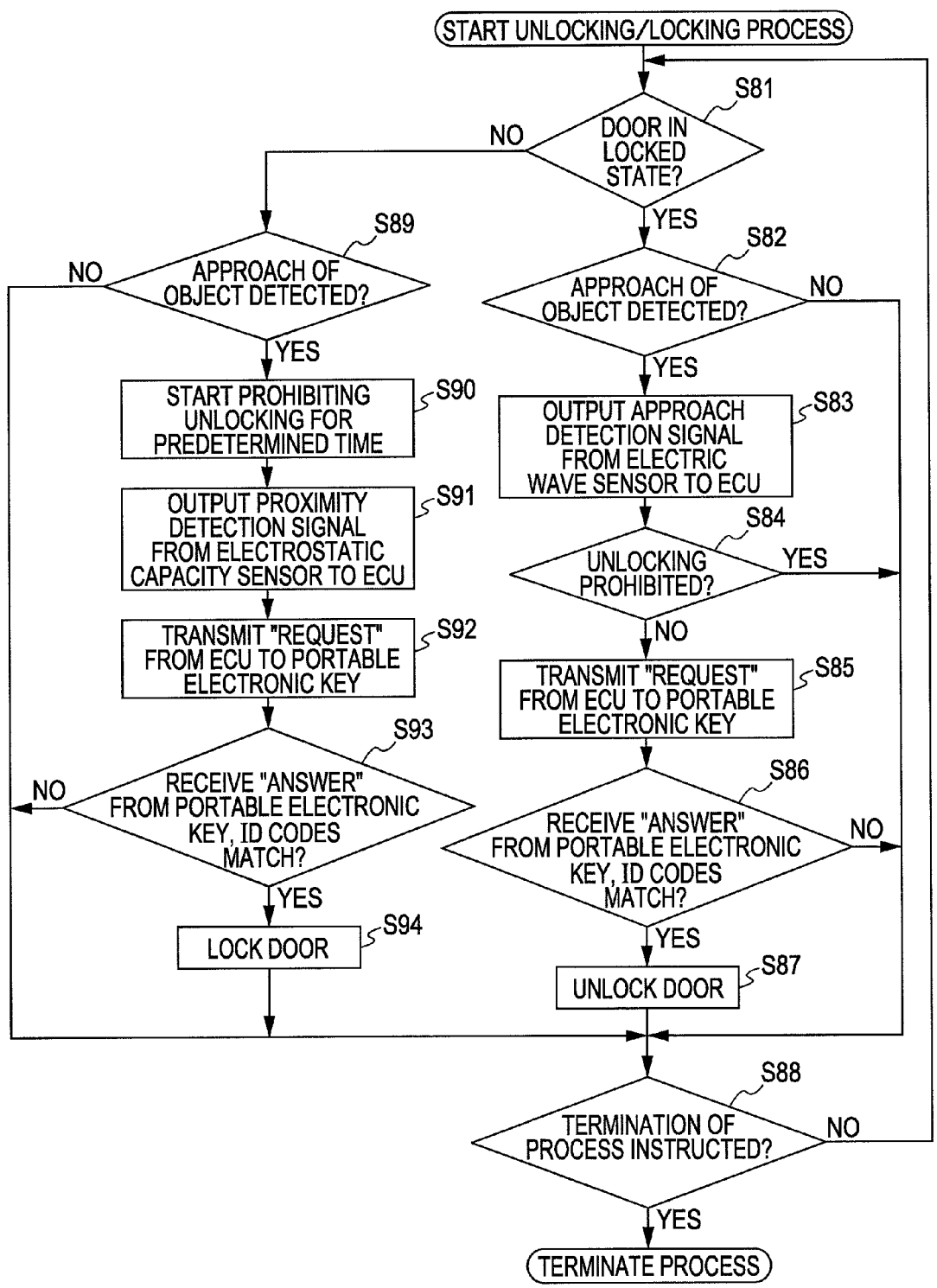
FIG. 12 is a flowchart explaining one example of the unlocking/locking process by the passive entry system of FIG. 9.

The processes of steps S81 to S83 of FIG. 12 are the same as the processes of steps S31 to S33 of FIG. 10, the processes of steps S85 to S89 of FIG. 12 are the same as the processes of steps S34 to S38 of FIG. 10, and the processes of steps S91 to S94 of FIG. 12 are the same as the processes of steps S39 to S42 of FIG. 10, and thus the respective description will be appropriately omitted.

After the proximity of the object is detected, the ECU 12 starts to prohibit the unlocking of the door 112 only for a predetermined time in step S90. The process thereafter proceeds to step S91.

The time of prohibiting the unlocking is not particularly limited. For instance, the time of prohibiting the unlocking may be arbitrarily specified by the user. However, the time of prohibiting the unlocking is, for example, two seconds in the present embodiment.

In the present embodiment, not only the unlocking of the door where the electric wave sensor 161 is installed, but the unlocking of all the doors of the vehicle is also prohibited. However, this is not the sole case, and only the unlocking of the door where the electric wave sensor 161 is installed may be prohibited.

After the processes of steps S90 and S91, the process proceeds to step S93. The determination is made as YES in step S93 and the process proceeds to step S94 if the user of the hand 101 has a legitimate driving authority, and the ID code of the "answer" from the portable electronic key 11 matches the code given to the person having legitimate driving authority. In step S94, the ECU 12 controls the motor 15 and locks the door 112. The process thereafter proceeds to step S88.

In step S88, determination is made as NO unless termination of the process is instructed, and the process proceeds to step S81. In this case, determination is made as YES in step S81 since the door is locked, and the process proceeds to step S82. The hand 101 sometimes enters the electric wave detection region 121 when moving away from the door 112 after locking the door 112. In this case, determination is made as YES in step S82, and the process proceeds to step S83.

After the process of step S83, the ECU 12 determines whether or not the unlocking is prohibited in step S84.

Determination is made as YES in step S84 as long as within the predetermined time in which the unlocking is prohibited, and the process proceeds to step S88.

When the predetermined time in which the unlocking is prohibited has elapsed, determination is made as NO in step S84, the process proceeds to step S85, and the subsequent processes are repeated.

The unlocking within a predetermined time after the proximity of the object is thereby prohibited.

Next, another example of the unlocking/locking process in the passive entry system of FIG. 9 will be described with reference to the flowchart of FIG. 13.

Figure 13:
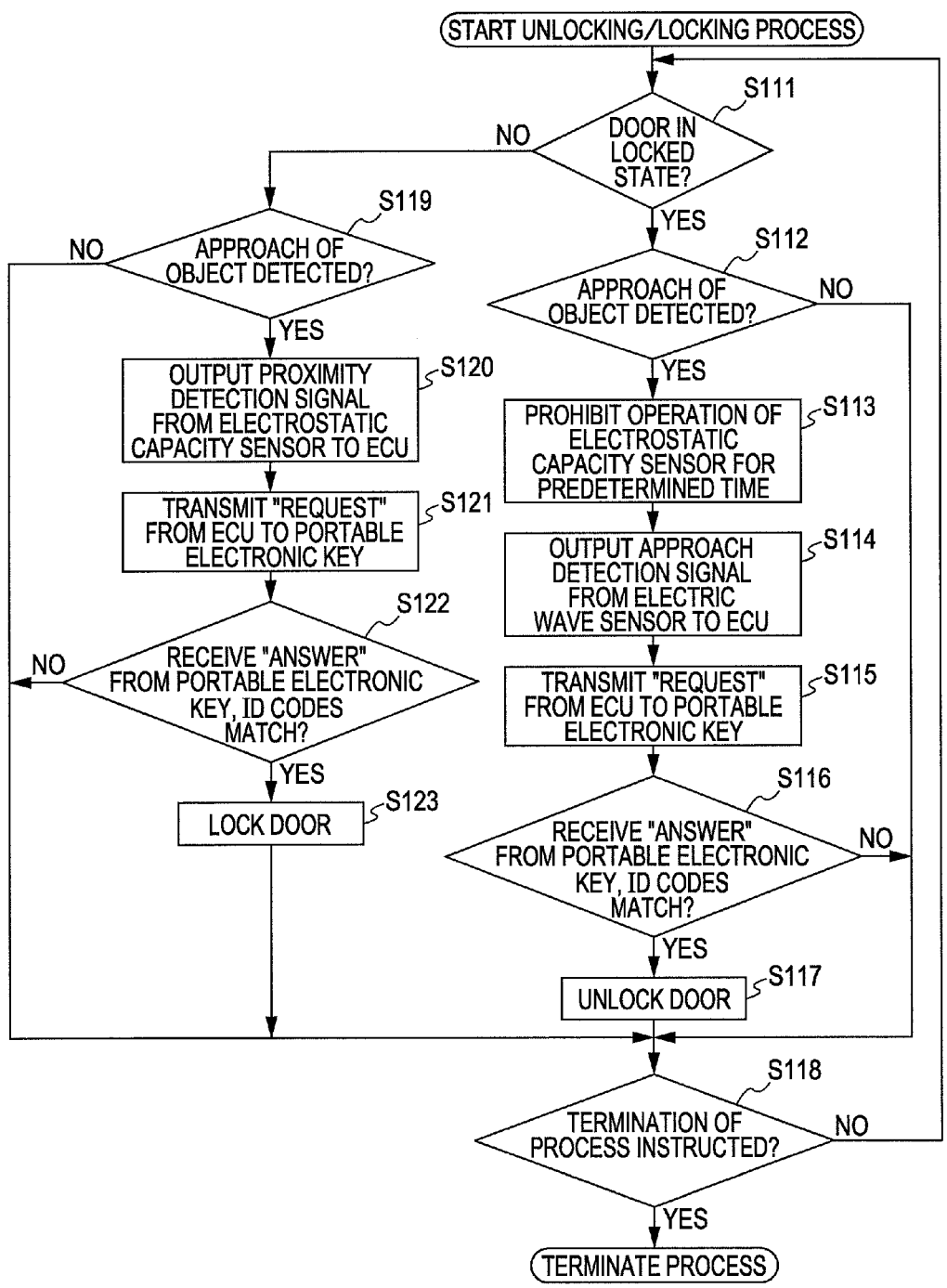
FIG. 13 is a flowchart explaining one example of the unlocking/locking process by the passive entry system of FIG. 9.

The processes of steps S111 to S112 of FIG. 13 are the same as the processes of steps S31 to S32 of FIG. 10, and the processes of steps S114 to S123 of FIG. 13 are the same as the processes of steps S33 to S42 of FIG. 10, and thus the respective description will be appropriately omitted.

After the approach of the object is detected, the ECU 112 starts to prohibit the operation of the electrostatic capacity sensor 162 for a predetermined time in step S113. The process thereafter proceeds to step S114.

The time of prohibiting the operation of the electrostatic capacity sensor 162 is not particularly limited. For instance, the time of prohibiting the operation of the electrostatic capacity sensor 162 may be arbitrarily specified by the user. However, the time of prohibiting the operation of the electrostatic capacity sensor 162 is, for example, two seconds in the present embodiment.

After the processes of steps S114 and S115, the process proceeds to step S116. The determination is made as YES in step S116 and the process proceeds to step S117 if the user of the hand 101 has a legitimate driving authority, and the ID code of the "answer" from the portable electronic key 11 matches the code given to the person having legitimate driving authority. In step S117, the ECU 12 controls the motor 15 and locks the door 112. The process thereafter proceeds to step S118.

In step S118, determination is made as NO unless the termination of the process is instructed, and the process proceeds to step S111. In this case, determination is made as YES in step S111 since the door is unlocked, and the process proceeds to step S119. The hand 101 sometimes enters the electrostatic detection region 123 by mistake after unlocking the door 112. In this case as well, the electrostatic capacity sensor 162 cannot detect the proximity of the object as long as within the predetermined time in which the operation of the electrostatic capacity sensor 162 is prohibited, and thus determination is made as NO in step S119, the process proceeds to step S118, and the subsequent processes are repeated.

The locking of the door within a predetermined time after the approach of the object is prohibited by prohibiting the operation of the electrostatic capacity sensor 162 for a predetermined time.

Next, another example of the unlocking/locking process in the passive entry system of FIG. 9 will be described with reference to the flowchart of FIG. 14.

Figure 14:
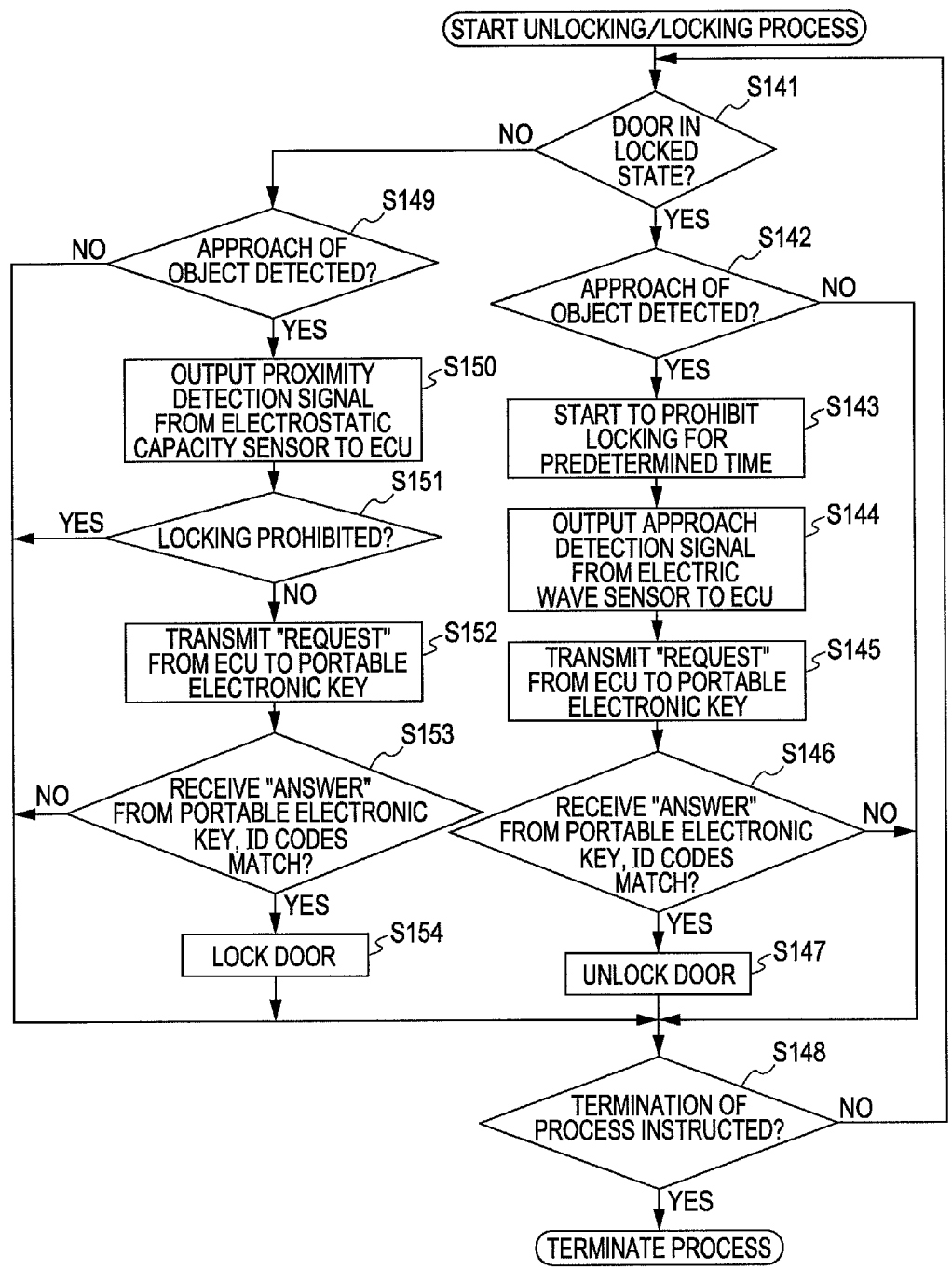
FIG. 14 is a flowchart explaining one example of the unlocking/locking process by the passive entry system of FIG. 9.

The processes of steps S141 to S142 of FIG. 14 are the same as the processes of steps S31 to S32 of FIG. 10, the processes of steps S144 to S150 of FIG. 14 are the same as the processes of steps S33 to S39 of FIG. 10, and the processes of steps S152 to S154 of FIG. 14 are the same as the processes of steps S40 to S42 of FIG. 10, and thus the respective description will be appropriately omitted.

After the approach of the object is detected, the ECU 12 starts to prohibit the locking of the door 112 only for a predetermined time in step S143. The process then proceeds to step S144.

The time of prohibiting the locking of the door 112 is not particularly limited. For instance, the time of prohibiting the locking of the door 112 may be arbitrarily specified by the user. In the present embodiment, the time of prohibiting the locking of the door 112 is, for example, two seconds in the present embodiment.

In the present embodiment, not only the locking of the door where the electrostatic capacity sensor 162 is installed, but the locking of all the doors of the vehicle is also prohibited. However, this is not the sole case, and only the locking of the door where the electrostatic capacity sensor 162 is installed may be prohibited.

After the processes of steps S144 and S145, the process proceeds to step S146. The determination is made as YES in step S146 and the process proceeds to step S147 if the user of the hand 101 has a legitimate driving authority, and the ID code of the "answer" from the portable electronic key 11 matches the code given to the person having legitimate driving authority. In step S147, the ECU 12 controls the motor 15 and unlocks the door 112. The process thereafter proceeds to step S148.

In step S148, determination is made as NO unless the termination of the process is instructed, and the process proceeds to step S141. In this case, determination is made as YES in step S141 since the door is unlocked, and the process proceeds to step S149. The hand 101 sometimes enters the electrostatic detection region 123 by mistake after unlocking the door 112. In this case, the process of step S149 is determined as YES, and the process proceeds to step S150. After the process of step S150, the process proceeds to step S151. The ECU 12 determines whether or not the locking is prohibited in step S151.

Determination is made as YES in step S151 as long as within the predetermined time in which the locking is prohibited, and the process proceeds to step S152.

When the predetermined time in which the locking is prohibited has elapsed, determination is made as NO in step S151, the process proceeds to step S152, and the subsequent processes are repeated.

The locking of the door within a predetermined time after the approach of the object is thereby prohibited.

In the unlocking/locking process of FIGS. 10 to 14, the power is simultaneously supplied to both the electric wave sensor 161 and the electrostatic capacity sensor 162. However, it is not essential to simultaneously supply the power to both sensors, and the power may be supplied to only any one of the electric wave sensor 161 and the electrostatic capacity sensor 162 according to the locked state. The power consumption thus can be further reduced.

Figure 15:
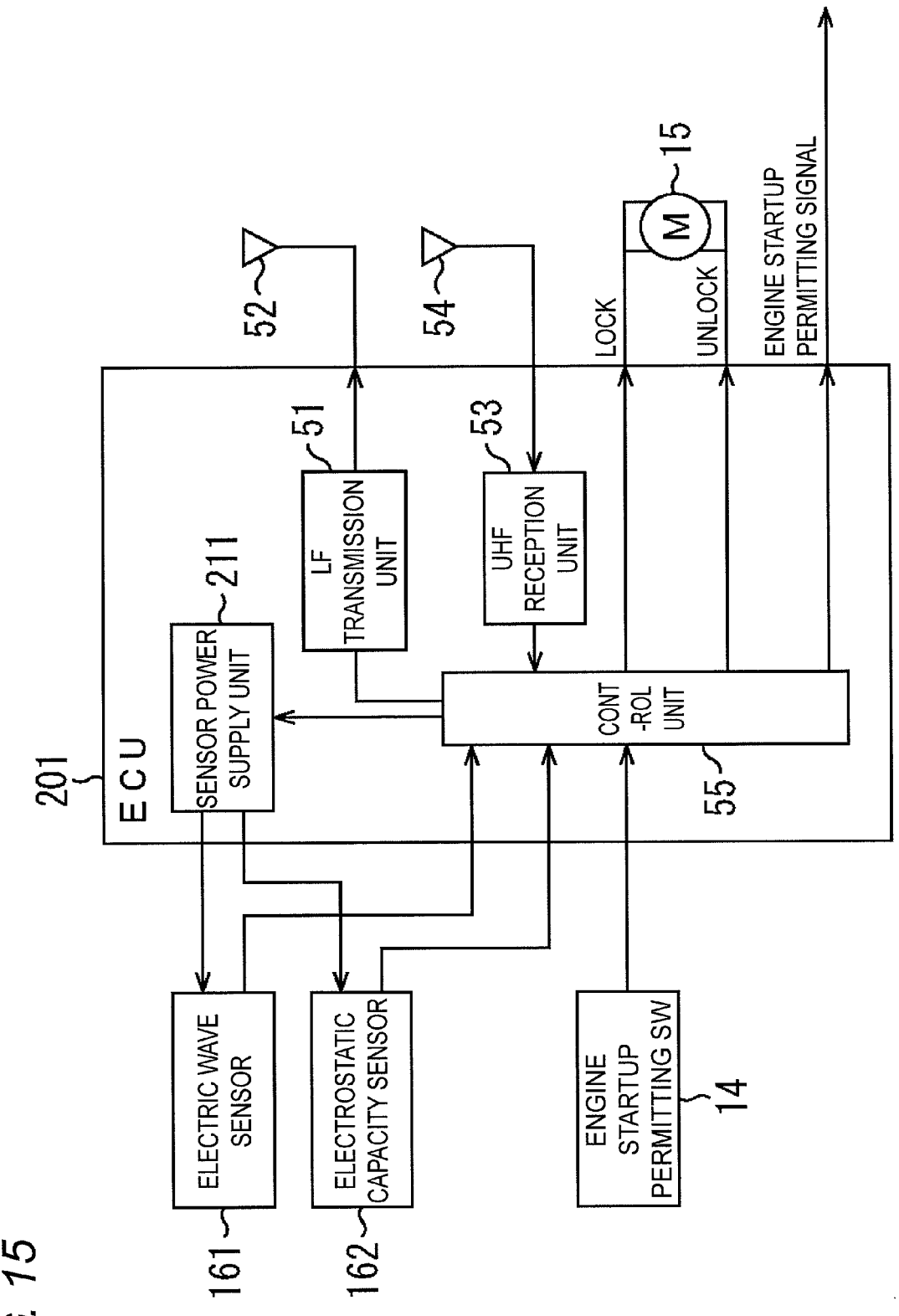
FIG. 15 is a block diagram showing another example of the configuration of the passive entry system of FIG. 1.

FIG. 15 is a view showing another example of the configuration of the passive entry system.

In FIG. 15, the same references numerals are denoted for the corresponding portions in FIG. 9, and the description thereof will be appropriately omitted. The illustration of the portable electronic key 11 is omitted in FIG. 15.

In the passive entry system of FIG. 15, the electric wave sensor 161 and the electrostatic capacity sensor 162 configuring the door knob sensor 140 are respectively arranged as individual blocks in place of the door knob sensor 140 of FIG. 9. The ECU 201 of FIG. 15 has a sensor power supply unit 211 attached to the ECU 12 of FIG. 9.

The sensor power supply unit 211 is a power source of the electric wave sensor 161 and the electrostatic capacity sensor 162, and starts and stops the supply of power to the electric wave sensor 161 and the electrostatic capacity sensor 162 based on the control of the control unit 55.

Next, another example of the unlocking/locking process in the passive entry system of FIG. 15 will be described with reference to the flowchart of FIG. 16.

Figure 16:
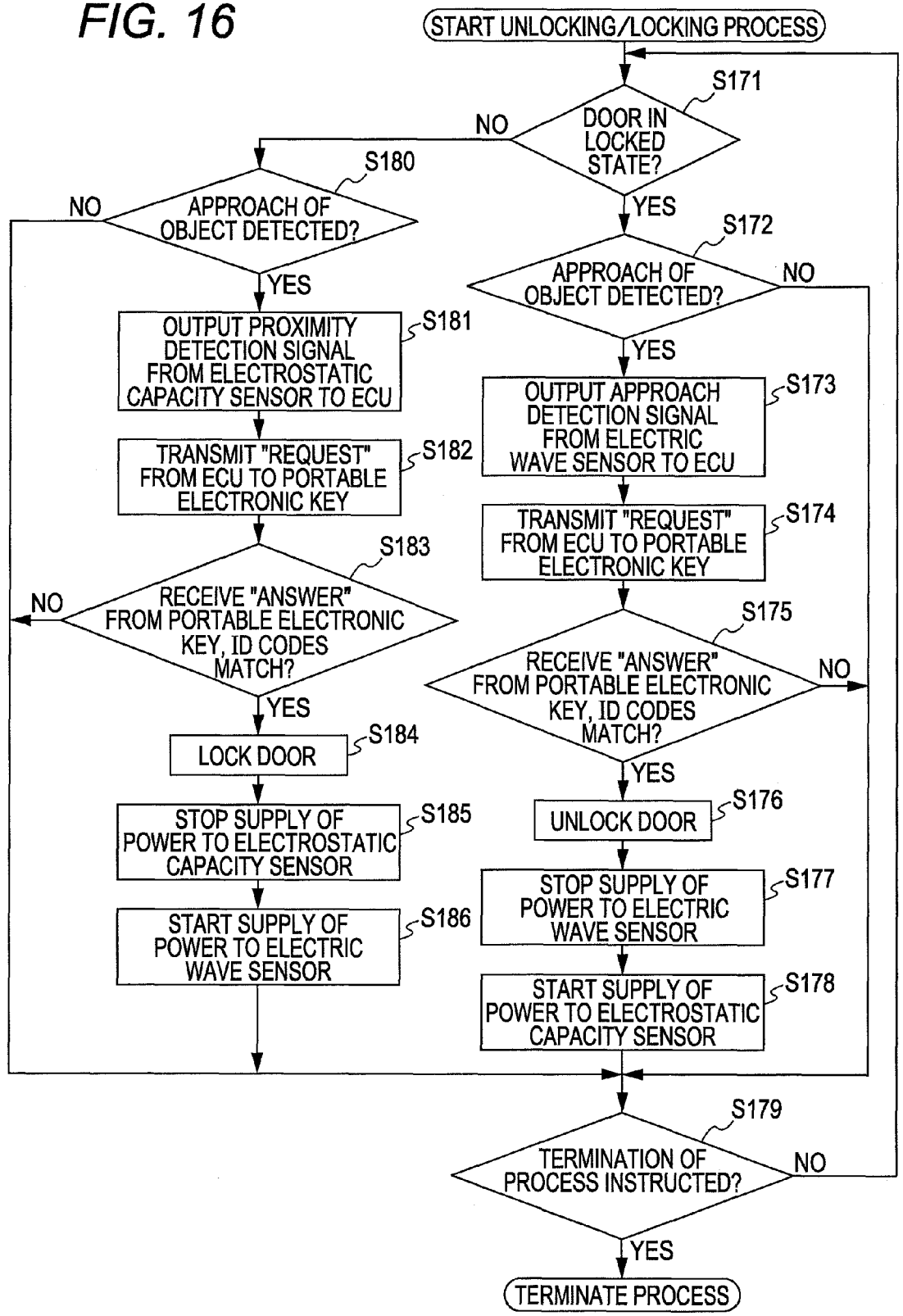
FIG. 16 is a flowchart explaining one example of an unlocking/locking process by the passive entry system of FIG. 15.

The processes of steps S171 to S176 of FIG. 16 are the same as the processes of steps S31 to S36 of FIG. 10, and the processes of steps S179 to S184 of FIG. 16 are the same as the processes of steps S37 to S42 of FIG. 10, and thus the respective description will be appropriately omitted.

If the door 112 is in the locked state, the process of step S171 is determined as YES, and the process proceeds to step S172. Here, since the power is supplied to the electric wave sensor 161, the electric wave sensor 161 can detect the hand 101 when the hand 101 enters the electric wave detection region 121. The process of step S172 is then determined as YES and the process proceeds to step S173.

After the processes of steps S173 and S174, the process proceeds to step S175. The determination is made as YES in step S175 and the process proceeds to step S176 if the user of the hand 101 has a legitimate driving authority, and the ID code of the "answer" from the portable electronic key 11 matches the code given to the person having legitimate driving authority. In step S176, the ECU 12 controls the motor 15 and unlocks the door 112. The process thereafter proceeds to step S177.

In step S177, the control unit 55 controls the sensor power supply unit 211, and stops the supply of power to the electric wave sensor 161.

In step S178, the control unit 55 controls the sensor power supply unit 211, and starts the supply of power to the electrostatic capacity sensor 162.

The process of step S179 is determined as NO unless the termination of the process is instructed, and the process proceeds to step S171. In this case, the door is unlocked, and thus the process of step S171 is determined as NO and the process proceeds to step S180. In this case, since the power is supplied to the electrostatic capacity sensor 162, the electrostatic capacity sensor 162 can detect the hand 101 when the hand 101 enters the electrostatic detection region 123. The process of step S52 is then determined as YES, and the process proceeds to step S181.

After the processes of steps S181 and S182, the process proceeds to step S183. The determination is made as YES in step S183 and the process proceeds to step S184 if the user of the hand 101 has a legitimate driving authority, and the ID code of the "answer" from the portable electronic key 11 matches the code given to the person having legitimate driving authority. In step S183, the ECU 12 controls the motor 15 and locks the door 112. The process thereafter proceeds to step S185.

In step S185, the control unit 55 controls the sensor power supply unit 211, and stops the supply of power to the electrostatic capacity sensor 162.

In step S186, the control unit 55 controls the sensor power supply unit 211, and starts the supply of power to the electric wave sensor 161. The process thereafter proceeds to step S179.

In step S179, determination is made as NO unless the termination of the process is instructed, and the process proceeds to step S171. In this case, determination is made as YES in step S171 since the door is unlocked, and the process proceeds to step S172. In this case, since the power is supplied to the electric wave sensor 161, the electric wave sensor 161 can detect the hand 101 when the hand 101 enters the electric wave detection region 121. The process of step S172 is then determined as YES, the process proceeds to step S173, and the subsequent processes are repeated.

In the example of FIG. 16, the door 112 can be locked even immediately after the approach of the object is detected, and the door 112 can be unlocked even immediately after the proximity of the object is detected, similar to the example of FIG. 10. In other words, the false operations such as mistakenly locking immediately after unlocking and mistakenly unlocking immediately after locking occur. It is thus effective to perform a control of prohibiting the unlocking of the door for a predetermined period when the object is detected by the electrostatic capacity sensor 162, similar to the example of FIG. 10. Alternatively, it is effective to perform a control of prohibiting the locking of the door for a predetermined period when the object is detected by the electric wave sensor 161.

In the example of FIG. 16, the sensor power supply unit 211 is arranged in the ECU, and the power is supplied to each sensor from the sensor power supply unit 211, but a power supply may be arranged in the electric wave sensor and the electrostatic capacity sensor.

Figure 17:
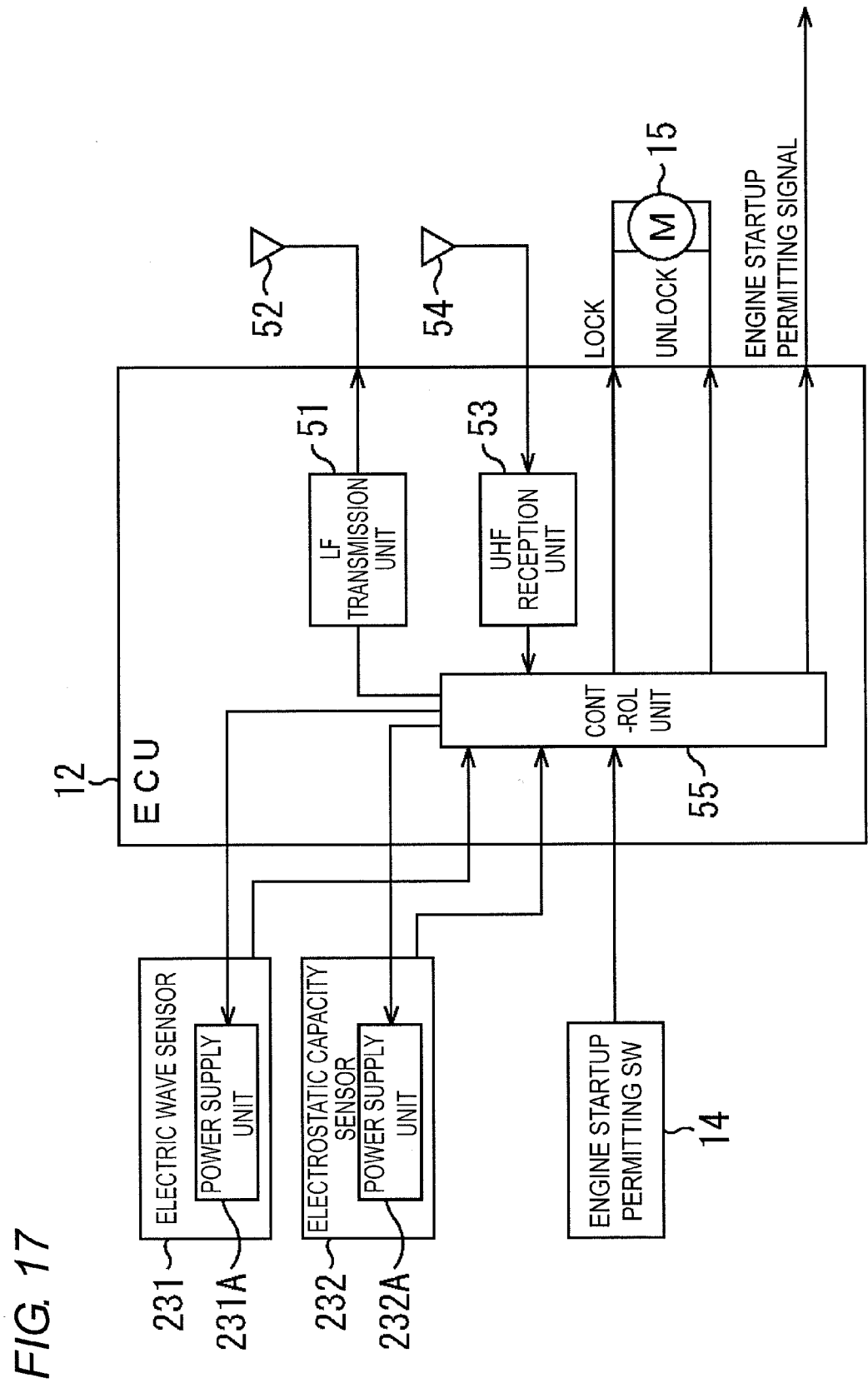
FIG. 17 is a block diagram showing another example of the configuration of the passive entry system of FIG. 1.

FIG. 17 is a view showing another example of the configuration of the passive entry system.

In FIG. 17, the same references numerals are denoted for the corresponding portions in FIG. 9, and the description thereof will be appropriately omitted. The illustration of the portable electronic key 11 is omitted in FIG. 17.

In the passive entry system of FIG. 17, the electric wave sensor and the electrostatic capacity sensor configuring the door knob sensor 140 are respectively arranged as individual blocks in place of the door knob sensor 140 of FIG. 9, and a power supply unit is built in each of the electric wave sensor and the electrostatic capacity sensor. The electric wave sensor and the electrostatic capacity sensor are respectively referred to as an electric wave sensor 231 and an electrostatic capacity sensor 232. Furthermore, the power supply unit of the electric wave sensor 231 is hereinafter referred to as a power supply unit 231A, and the power supply unit of the electrostatic capacity sensor 232 is hereinafter referred to as a power supply unit 232A.

Comparing the passive entry system of FIG. 17 and the passive entry system of FIG. 15, the control unit 55 controls the power supply unit 231A of the electric wave sensor 231 to control the supply of power to the electric wave sensor 231 in the passive entry system of FIG. 17. The control unit 55 also controls the power supply unit 232A of the electrostatic capacity sensor 232 to control the supply of power to the electrostatic capacity sensor 232.

In the passive entry system of FIG. 15, on the other hand, the control unit 55 controls the sensor power supply unit 211 to control the supply of power to the electric wave sensor 161, and supplies power to the electric wave sensor 161. The control unit 55 also controls the sensor power supply unit 211 to control the supply of power to the electrostatic capacity sensor 162, and supplies power to the electrostatic capacity sensor 162.

Therefore, the controlling target of the control unit 55 differs between the passive entry system of FIG. 17 and the passive entry system of FIG. 15. However, the respective systems are the same in that the supply of power to the electric wave sensor and the electrostatic capacity sensor is started and stopped. Therefore, the passive entry system of FIG. 17 can perform processes similar to the unlocking/locking process performed by the passive entry system of FIG. 15.

Figure 18:
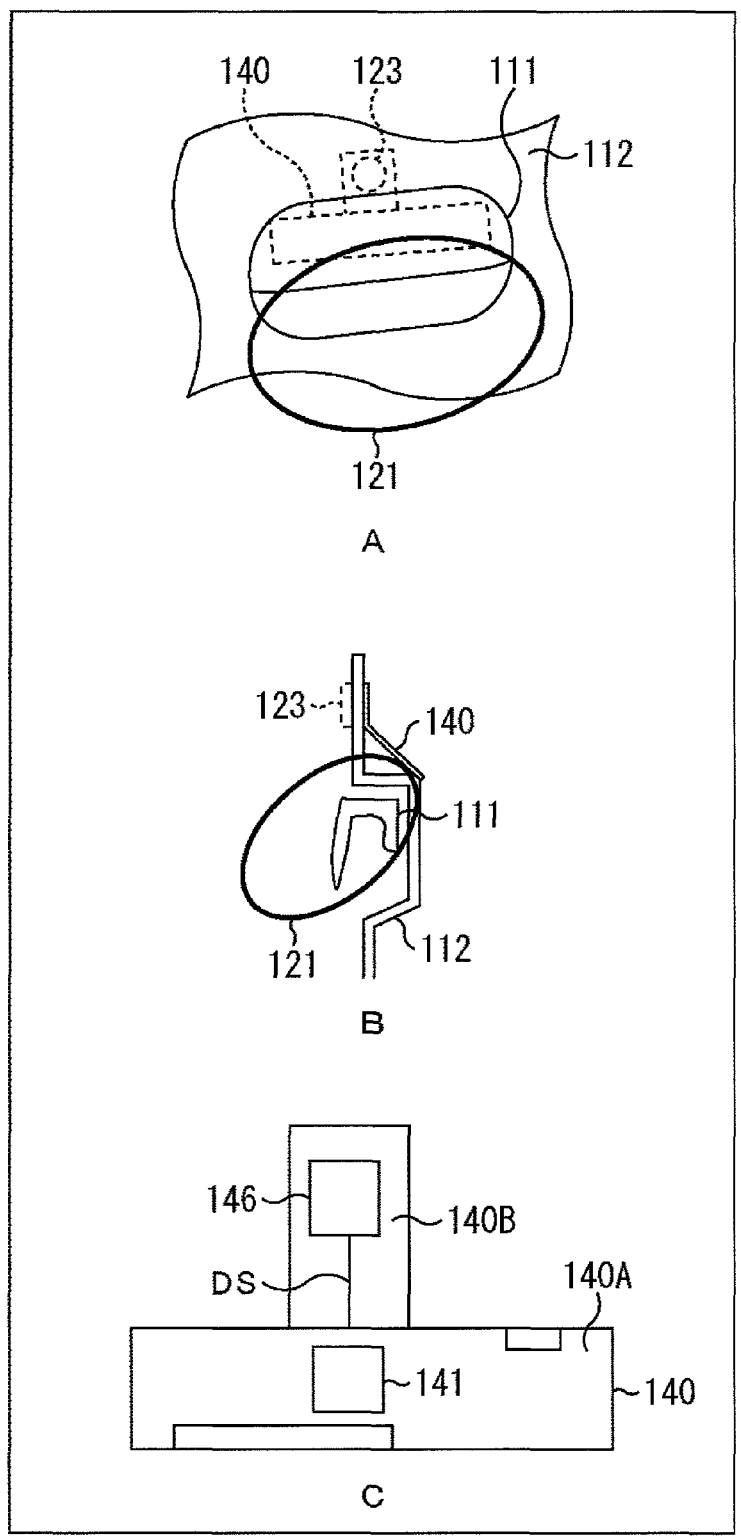
FIG. 18 is a view describing one example of an attachment position with respect to the door of the door knob sensor of FIG. 6.
Figure 19:
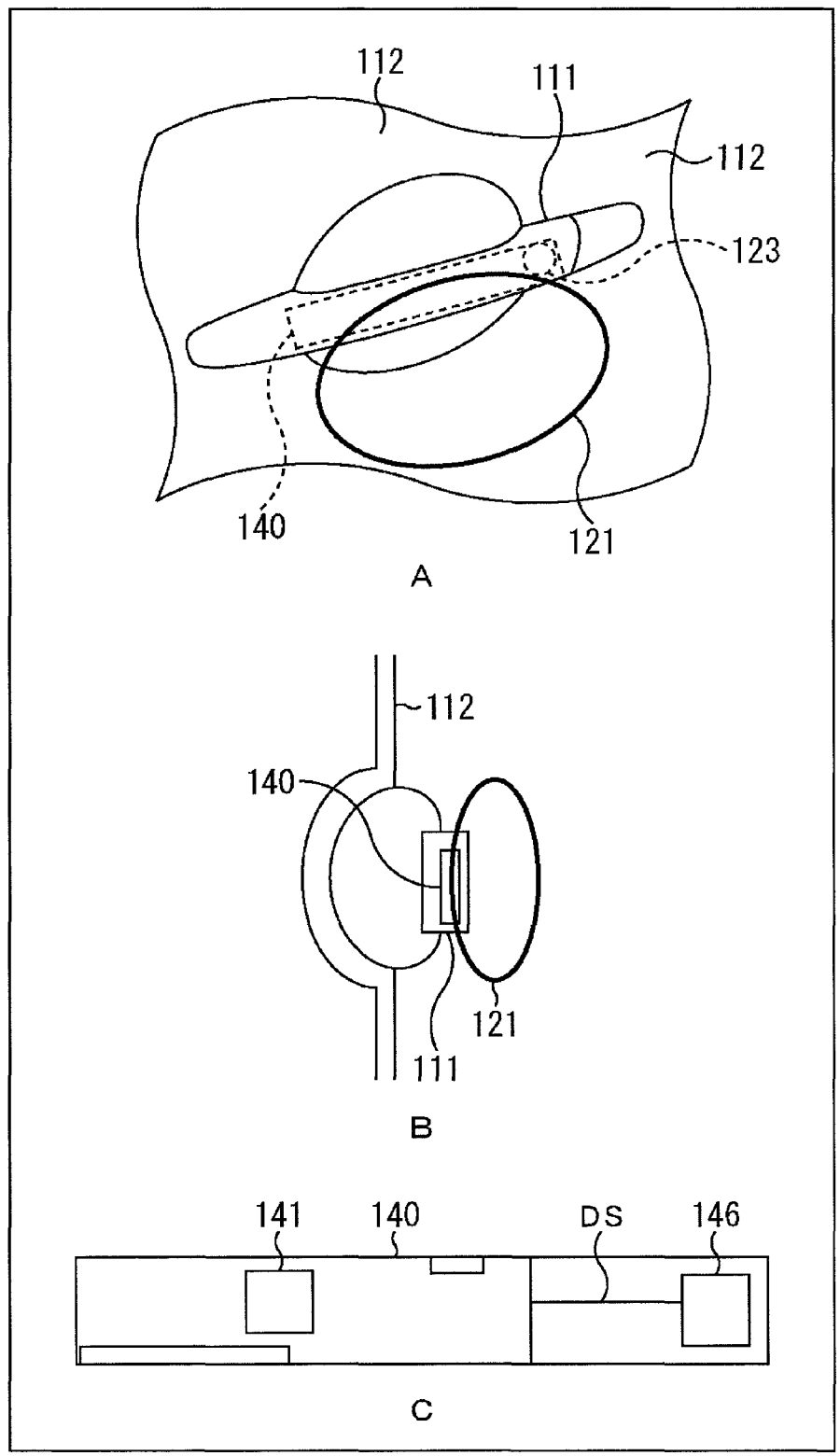
FIG. 19 is a view describing one example of an attachment position with respect to the door of the door knob sensor of FIG. 6.

An example of the attachment position with respect to the door of the sensor made up of a combination of the electrostatic capacity sensor and the electric wave sensor will be described below with reference to FIGS. 18 and 19. The door knob sensor 140 described above is adopted for the example of the sensor in FIGS. 18 and 19.

Currently, the outer handle mainly include a flap handle type and a bar handle type. The flap handle is a flap-shaped handle, and is an outer handle of a type in which the outer handle moves so as to lift up to the near side with the axis in the left and right direction positioned slightly above the outer handle as the center when the door of the vehicle is seen from the front. The bar handle is a bar-shaped outer handle, and is an outer handle of a type in which the outer handle slidably moves to the near side when the door is seen from the front.

FIG. 18(A) is a view showing one example of the attachment position of the door knob sensor 140 in the outer handle of the flap handle type. FIG. 18(B) is a view showing one example of a cross-sectional layout of the outer handle of the flap handle type. FIG. 18(C) is a view showing a shape of the door knob sensor 140 in the outer handle of the flap handle type.

The outer handle of the flap handle type of FIG. 18(A) is basically the same as the outer handle of the flap handle type shown in FIG. 7 and FIG. 8. However, they are described as basically the same because the outer handle of the flap handle type of FIG. 18(A) and the outer handle of the flap handle type shown in FIG. 7 and FIG. 8 differ in the position of the electrostatic detection region 123. In other words, the electrostatic detection region 123 is the region above the outer handle in the outer handle of the flap handle type of FIG. 18(A), whereas the electrostatic detection region 123 is the region on the left end of the outer handle in the outer handle of the flap handle type of FIG. 7 and FIG. 8.

The door knob sensor 140 of FIG. 18(C) is a substrate having a convex shape upward, and is configured by a substrate 13A of rectangular shape extending in the horizontal direction, and a substrate 13B of rectangular shape extending in the upward direction. The substrate 13A is arranged with the sensor control unit 141 and the delay generation unit 142 to the detection circuit 145 (not shown). The substrate 13B is arranged with the electrode 146, and an electrode line DS connecting the electrode 146 and the detection circuit 145. The surface on the side arranged with the sensor control unit 141 of the door knob sensor 140 is hereinafter referred to as a front surface.

In the example of FIG. 18(B), the door knob sensor 140 is arranged such that the front surface faces downward on the near side (lower left in FIG. 18(B)). The electric wave detection region 121 is thus an elliptical region extending in the direction of downward on the near side of the outer handle 111. As a result, the hand approaching the outer handle 111 of the flap handle type when opening the door can be detected.

FIG. 19(A) is a view showing one example of the attachment position of the door knob sensor 140 in the outer handle of the bar handle type. FIG. 19(B) is a view showing one example of a cross-sectional layout of the outer handle of the bar handle type. FIG. 19(C) is a view showing the shape of the door knob sensor 140 in the outer handle of the bar handle type.

In the outer handle of the bar handle type of FIG. 19(A), the electric wave detection region 121 is a region on the near side of the outer handle 111. The electrostatic detection region 123 is a region on the right end of the outer handle 111.

The door knob sensor 140 of FIG. 19(C) is a rectangular substrate. The door knob sensor 140 has the sensor control unit 141 arranged slightly to the left from the middle, and the delay generation unit 142 to the detection circuit 145 (not shown) are also arranged. The electrode 146 is arranged at the right end. The electrode 146 and the detection circuit 145 are connected with the electrode line DS.

In the example of FIG. 19(B), the front surface of the door knob sensor 140 faces the near side (right in FIG. 19(B)). Thus, the electric wave detection region 121 is positioned on the near side of the outer handle 111, and has an elliptical shape extending in the up and down direction (up and down direction in FIG. 19(B)) in this example. As a result, the hand approaching the outer handle 111 of the bar handle type when opening the door can be detected.

A third embodiment of the present embodiment will now be described. The third embodiment greatly differs from the first and the second embodiments described above in the following points.

In the first and the second embodiment, a method of "unlocking using an electric wave sensor, and locking using an electrostatic capacity sensor" is adopted as a method of controlling unlocking and locking. In the third embodiment, a method of "performing unlocking or locking using an electrostatic capacity sensor, but simultaneously using an electric wave sensor to reduce a false operation of an electrostatic capacity sensor" is adopted as a method of controlling unlocking and locking.

Before describing the third embodiment, the conventional electrostatic capacity sensor will be described to facilitate an understanding of the third embodiment.

The conventional electrostatic capacity sensor recognizes contact and proximity of the object to be detected by the change in an electrostatic capacity formed between the object to be detected including a dielectric, such as a human body, and the electrode arranged in the sensor. It is described as the object to be detected because the object that may become a target to be detected is limited to the dielectric, for example, the human body. In the description of the electrostatic capacity sensor below, the object refers to the object to be detected unless particularly stated. The conventional electrostatic capacity sensor converts the change in an electrostatic capacity to the change in an electrical signal of voltage, frequency, and the like, compares the converted electrical signal with a detection threshold value set in advance, and recognizes the contact and the proximity of the object when exceeding the detection threshold value.

Therefore, in the conventional electrostatic capacity sensor, the detection threshold value is set to a value lower than a normal value so that the detection sensitivity is set to a sensitivity higher than the normal sensitivity when recognizing the contact and the proximity from the change in an electrostatic capacity smaller than usual such as when recognizing the contact and the proximity of the hand wearing gloves. However, if the detection sensitivity is set to a high sensitivity, the electric signal easily exceeds the detection threshold value due to foreign noise from the portable telephone, a handy wireless device, and the like, the capacity change corresponding to the temperature characteristics of the capacitor configuring the electrostatic capacity sensor, and the like. Thus, false recognition of recognizing the contact and the proximity of the object although the contact and the proximity of the object do not exist arises. Therefore, the enhancement of detection sensitivity and the reduction of false detection are in a trade-off relationship in the conventional electrostatic capacity sensor, and they are difficult to satisfy.

The passive entry system enabling unlocking and locking of the door of the vehicle that is easy to use for a user using the electrostatic capacity sensor is the passive entry system of the third embodiment described below.

In the passive entry system of the third embodiment, the electrostatic capacity sensor and another type sensor of a type different from the electrostatic capacity sensor are combined, and such electrostatic capacity sensor and the other type sensor are configured as an integrated module (integrated module is the door knob sensor). However, the configuration does not need to be limited thereto, and a configuration in which the electrostatic capacity sensor and the other type sensor are installed at different places, and the like may be adopted.

Figure 20:
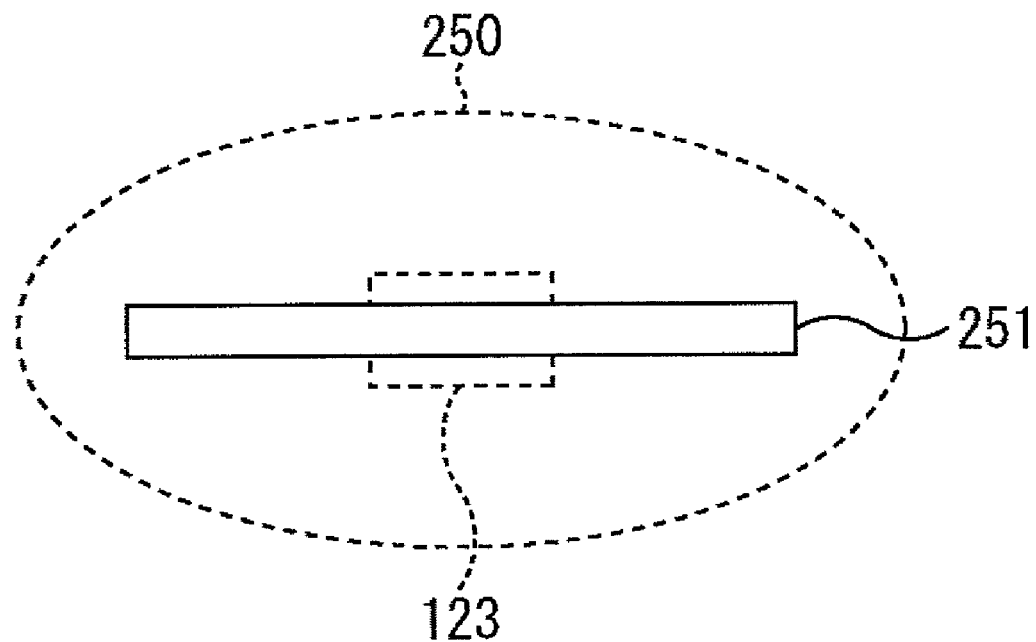
FIG. 20 is a view showing a detection region in another configuration example of the door knob sensor of the passive entry system of FIG. 1.

In a door knob sensor 251 including the electrostatic capacity sensor and the other type sensor configured as an integrated module, the electrostatic detection region 123 is set as the detection region of the electrostatic capacity sensor, and the other type detection region 250 of FIG. 20 is set as the detection region of the other type sensor. The other type detection region 250 is the region on the far side than the electrostatic detection region 123 with respect to the door of the vehicle including the door knob sensor 251 (not shown).

Figure 21:
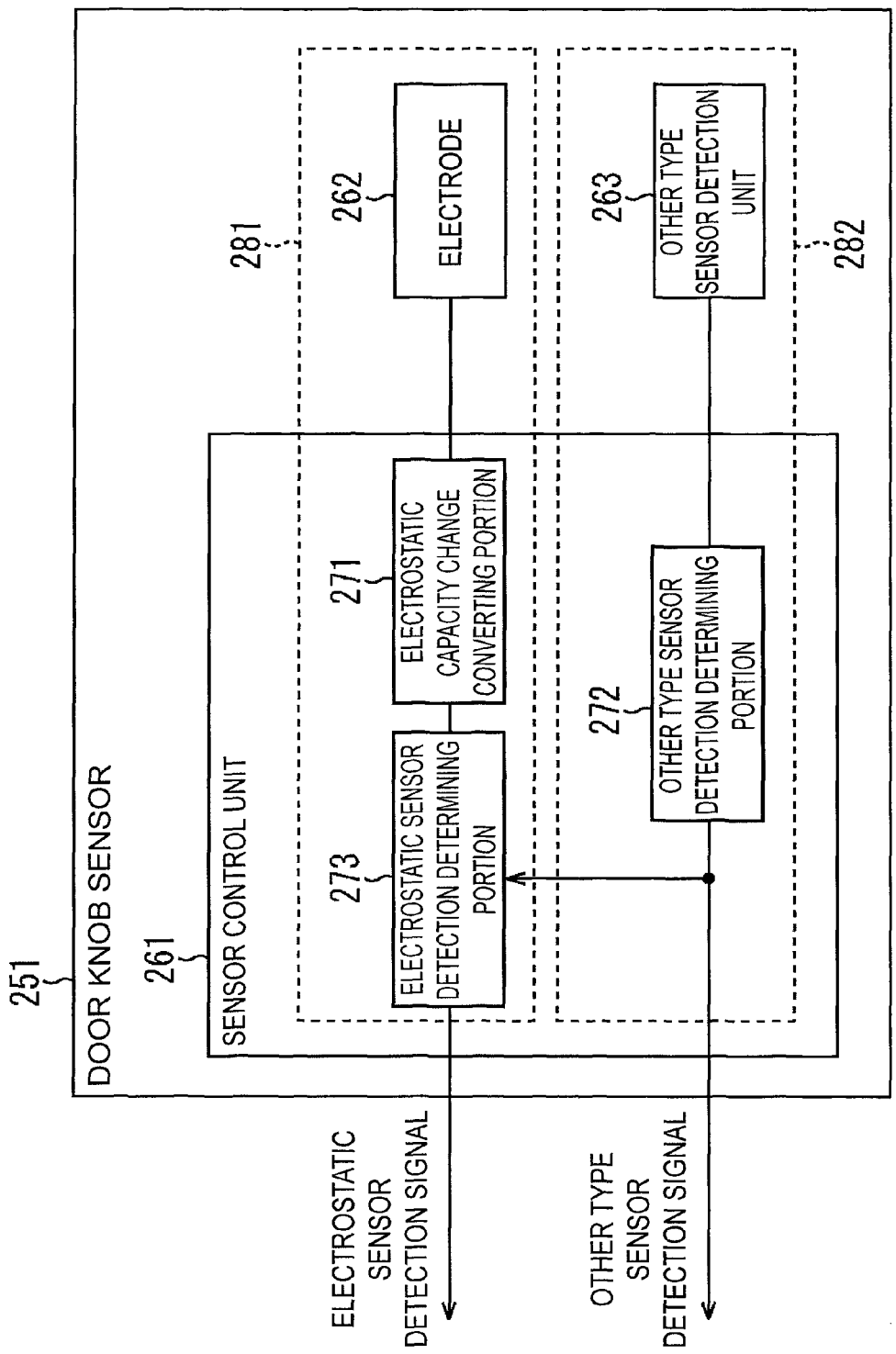
FIG. 21 is a block diagram showing an example of a configuration of the door knob sensor of FIG. 20.

FIG. 21 is a block diagram showing one example of a configuration of the door knob sensor 251.

The door knob sensor 251 is configured by a sensor control unit 261, an electrode 262, and another type sensor detection unit 263.

In other words, looking at the door knob sensor 251 from the standpoint of the combination of the electrostatic capacity sensor and the other type sensor, the portion of the other type sensor (hereinafter referred to as other type sensor 282) of the door knob sensor 251 is configured by the sensor control unit 261 and the other type sensor detection unit 263, and the portion of the electrostatic capacity sensor (hereinafter referred to as an electrostatic capacity sensor 281) of the door knob sensor 251 is configured by the sensor control unit 261 and the electrode 262. Thus, the sensor control unit 261 serving as a recognition unit of the sensor is commonly used by the other type sensor 282 and the electrostatic capacity sensor 281.

The sensor control unit 261 includes an electrostatic capacity change converting portion 271 to other type sensor detection determining portion 272, as shown in FIG. 21, for function blocks. The electrostatic capacity change converting portion 271 and an electrostatic sensor detection determining portion 273 are blocks related to the electrostatic capacity sensor 281. Therefore, the electrostatic capacity sensor 281 can be understood as being configured by the electrode 262, the electrostatic capacity change converting portion 271, and the electrostatic sensor detection determining portion 273. The other type sensor detection determining portion 272 is a block related to the other type sensor 282. Therefore, the other type sensor 282 can be understood as being configured by the other type sensor detecting unit 263 and the other type sensor detection determining portion 272.

When an object such as a human body enters the electrostatic detection region 123, the electrostatic capacity sensor 281 detects the object from the change in an electrostatic capacity between the object and the electrode 262. In other words, the electrostatic capacity change converting portion 271 of the electrostatic capacity sensor 281 converts the change in an electrostatic capacity between the object and the electrode 262 to the change in an electric signal such as a voltage and a frequency. The electrostatic sensor detection determining portion 273 measures the converted electric signal, detects the object to be detected when the electric signal is greater than (or smaller than) the detection threshold value set in advance, and outputs an electrostatic sensor detection signal indicating that the electrostatic capacity sensor detected the object to be detected. The electrostatic sensor detection determining portion 273 changes the own detection threshold value according to the presence of detection of the object to be detected by the other type sensor 282. The detection sensitivity of the electrostatic capacity sensor 281 is thereby changed. All processes of the electrostatic capacity sensor 281 described above are referred to as an electrostatic sensor detection process below.

When the object such as a human body enters the other type detection region 121, the other type sensor 282 detects the object from the change in an electric signal or the like unique to the other type sensor detecting unit 263. In other words, the other type sensor detecting unit 263 outputs an electric signal or the like in a predetermined range when the object enters the other type detection region 121. The other type sensor detection determining portion 272 detects the object when the electric signal or the like is in the predetermined range, and outputs another type sensor detection signal indicating that the other type sensor 282 detected the object. All processes of the other type sensor 282 described above are referred to as other type sensor detection process below.

Therefore, in the door knob sensor 140, the sensors of two types, the electrostatic capacity sensor 281 and the other type sensor 282, are simultaneously and independently operated.

Figure 22:
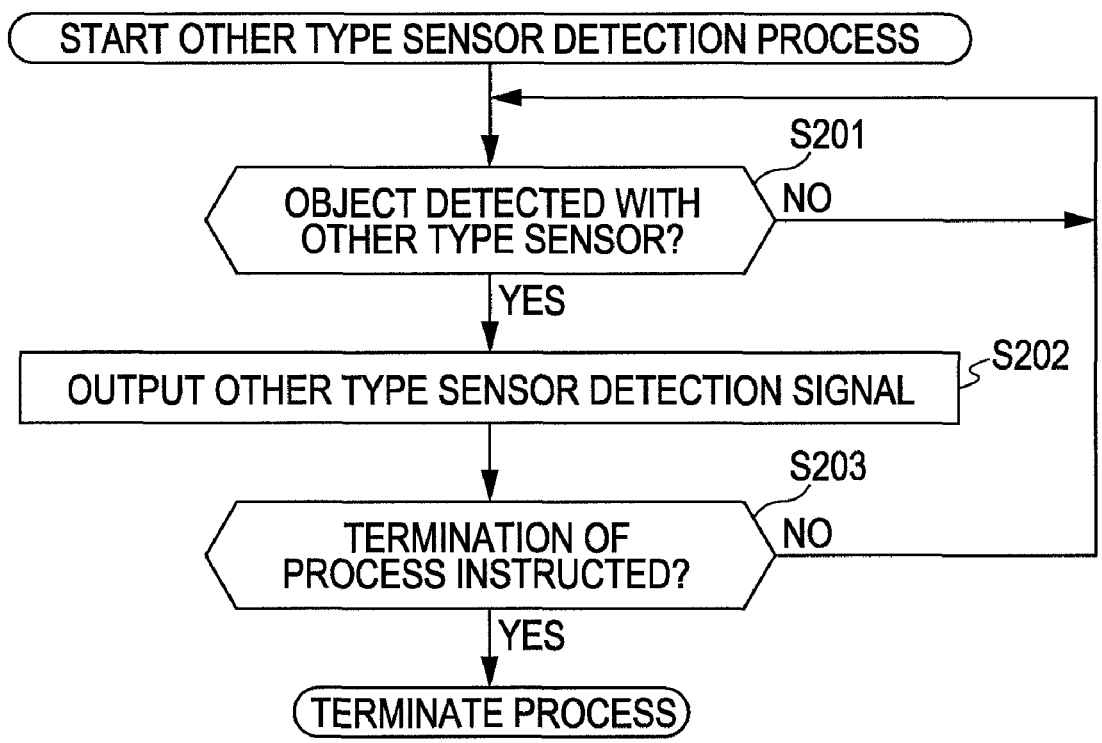
FIG. 22 is a flowchart explaining a multi-type sensor detection process by another type sensor of FIG. 21.

First, one example of the other type sensor detection process by the other type sensor 282 will be described with reference to the flowchart of FIG. 22.

In step S201, the other type sensor detection determining portion 272 of the other type sensor 282 determines whether or not the object is detected.

Unless the amount of change in the electric signal or the like output by the other type sensor detecting unit 263 exceeds a predetermined value, the process of step S201 is determined as NO, the process is returned to step S201, and the subsequent process is repeated.

When the amount of change in the electric signal or the like output by the other type sensor detecting unit 263 exceeds a predetermined value, the process of step S201 is determined as YES, and the process proceeds to step S202. In step S202, the other type sensor detection determining portion 272 outputs the other type sensor detection signal to the ECU 12.

In step S203, the other type sensor detection determining portion 272 determines whether or not the termination of the process is instructed.

Unless the termination of the process is instructed, the process of step S203 is determined as NO, the process is returned to step S201, and the subsequent processes are repeated.

When the termination of the process is instructed, the process of step S203 is determined as YES, and the other type sensor detection process is terminated.

Figure 23:
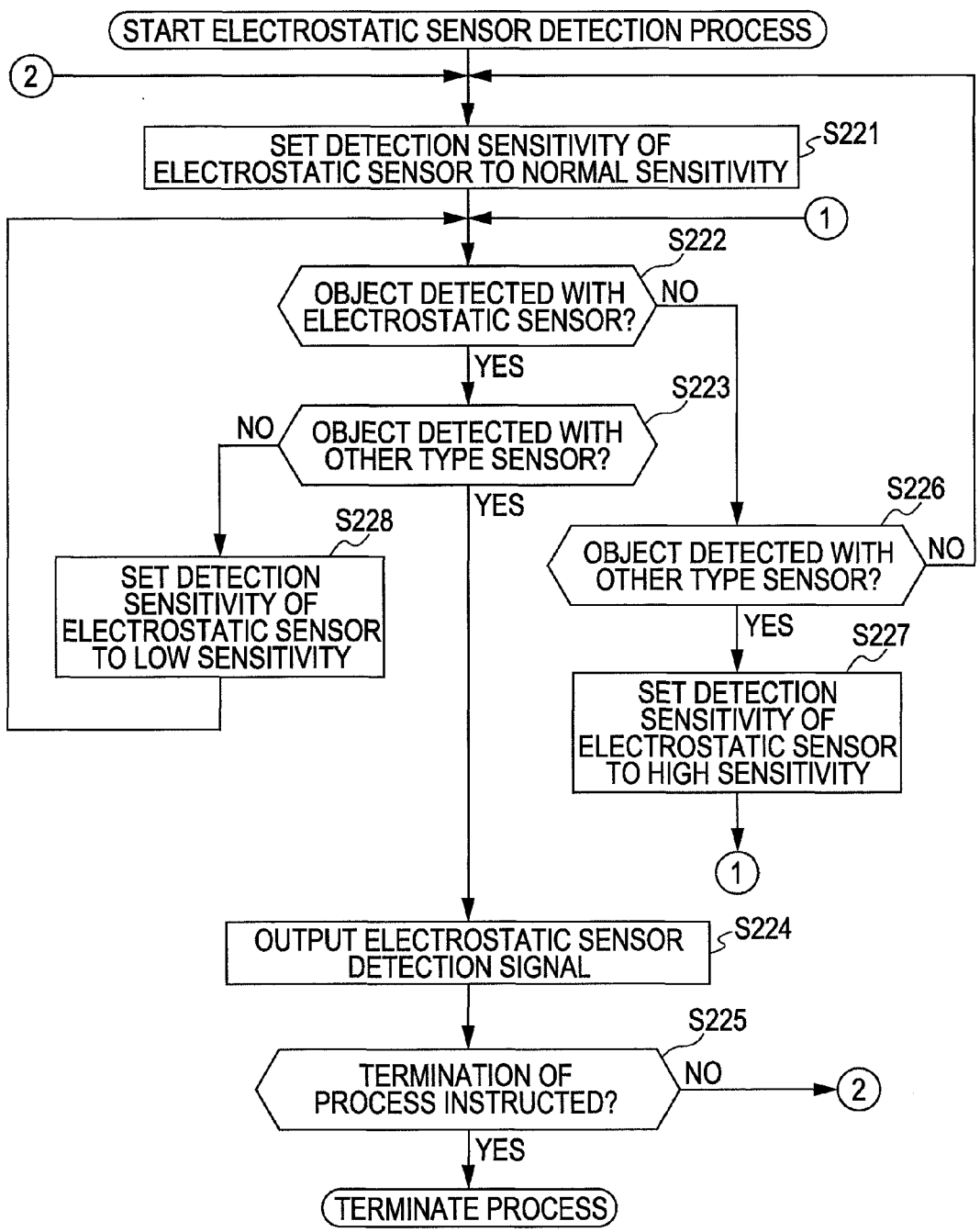
FIG. 23 is a flowchart explaining an electrostatic sensor detection process by an electrostatic capacity sensor of FIG. 21.

One example of the electrostatic sensor detection process by the electrostatic capacity sensor 281 will now be described with reference to the flowchart of FIG. 23.

In step S221, the electrostatic sensor detection determining portion 273 of the electrostatic capacity sensor 281 sets the detection sensitivity of the electrostatic capacity sensor 281 to the normal sensitivity. Specifically, the electrostatic sensor detection determining portion 273 sets the detection threshold value it uses to the standard threshold value.

In step S222, the electrostatic sensor detection determining portion 273 determines whether or not the object is detected by the electrostatic capacity sensor 281.

In other words, when the object enters the electrostatic detection region 123, the amount of change in the electric signal of after the conversion by the electrostatic capacity change converting portion 271 exceeds a predetermined value. The electrostatic capacity sensor 281 then detects the object.

Therefore, unless the amount of change in the electric signal of after the conversion by the electrostatic capacity change converting portion 271 exceeds a predetermined value, the process of step S222 is determined as NO, and the process proceeds to step S226. The processes after step S226 will be hereinafter described.

When the amount of change in the electric signal of after the conversion by the electrostatic capacity change converting portion 271 exceeds a predetermined value, the process of step S222 is determined as YES and the process proceeds to step S223. In step S223, the electrostatic sensor detection determining portion 273 determines whether or not the object is detected by the other type sensor 282.

In other words, when the object enters the other type detection region 250, the other type sensor detection signal is provided from the other type sensor detection determining portion 272 to the electrostatic sensor detection determining portion 273. The other type sensor 282 then detects the object.

Therefore, unless the other type sensor detection signal is provided from the other type sensor detection determining portion 272 to the electrostatic sensor detection determining portion 273, the process of step S223 is determined as NO, and the process proceeds to step S228. The processes after step S228 will be hereinafter described.

When the other type sensor detection signal is provided from the other type sensor detection determining portion 272 to the electrostatic sensor detection determining portion 273, the process of step S223 is determined as YES and the process proceeds to step S224. In step S224, the electrostatic sensor detection determining portion 273 outputs the electrostatic sensor detection signal.

In step S225, the electrostatic sensor detection determining portion 273 determines whether or not the termination of the process is instructed.

The process of step S225 is determined as NO unless the termination of the process is instructed, the process is returned to step S221, and the subsequent processes are repeated.

If the termination of the process is instructed, the process of step S225 is determined as YES, and the electrostatic sensor detection process is terminated.

When determined as NO in the process of step S222, the process proceeds to step S226. In step S226, the electrostatic sensor detection determining portion 273 determines whether or not the object is detected by the other type sensor 282.

Unless the other type sensor detection signal is provided from the other type sensor detection determining portion 272 to the electrostatic sensor detection determining portion 273, the process of step S226 is determined as NO, the process returns to step S221, and the above processes are repeated.

When the other type sensor detection signal is provided from the other type sensor detection determining portion 272 to the electrostatic sensor detection determining portion 273, the process of step S226 is determined as YES and the process proceeds to step S227. In step S227, the electrostatic sensor detection determining portion 273 sets the detection sensitivity of the electrostatic capacity sensor 281 to a high sensitivity. Specifically, the electrostatic sensor detection determining portion 273 sets the detection threshold value it uses to a threshold value lower than the standard threshold value. Thereafter, the process is returned to step S222, and the subsequent processes are repeated.

If determined as NO in the process of step S223, the process proceeds to step S228. In step S228, the electrostatic sensor detection determining portion 273 sets the detection sensitivity of the electrostatic capacity sensor 281 to a low sensitivity. Specifically, the electrostatic sensor detection determining portion 273 sets the detection threshold value it uses to a threshold value higher than the standard threshold value. Thereafter, the process is returned to step S222, and the subsequent processes are repeated.

Thus, if the object is detected by the electrostatic capacity sensor 281 but the object is not detected by the other type sensor 282, the detection of the object by the electrostatic capacity sensor 281 is assumed to be a false detection, and thus the detection sensitivity of the electrostatic capacity sensor 281 is set to a low sensitivity. If the object is not detected by the electrostatic capacity sensor 281 but the object is detected by the other type sensor 282, the object is assumed to have not entered the electrostatic detection region 123 but have entered the other type detection region 121, and thus the detection sensitivity of the electrostatic capacity sensor 281 is set to a high sensitivity in advance so that the object can be detected even with a slight change in a capacity. Through the above operations, the sensitivity of the electrostatic capacity sensor 281 can be set to a high sensitivity limited only to when the object is in the other type detection region 250, whereby enhancement of detection sensitivity and reduction of false operation can be realized.

The region of less than or equal to about 5 mm from the sensor can be set as the detection region in the electrostatic capacity sensor. However, in the electrostatic capacity sensor enhancement of detection sensitivity and reduction of false operation are difficult to realize, as described above. In the other type sensor, for example, the electric wave sensor, an optical sensor, and an ultrasonic sensor, the region of between 150 mm and 50 mm from the sensor can be set as the detection region. The other type sensor, however, sometimes outputs the detection signal even when the user does not have an intention of contacting with the area where the sensor is installed such as when passing right by the side of the sensor. Therefore, if the other type sensor is used for the switch for unlocking and locking the door, the door may be unintentionally unlocked and locked, and the user may feel insecure.

In the third embodiment, the electrostatic capacity sensor 281 and the other type sensor 282 are combined, and the object entering the electrostatic detection region 123 is detected with the detection sensitivity of the electrostatic capacity sensor 281 enhanced based on the other type sensor detection signal from the other type sensor 282. Thus, the intention of the user to bring the hand close to the electrostatic detection region 123 of the door knob sensor 251 can be reliably grasped. Furthermore, the detection accuracy of the electrostatic capacity sensor 281 can be further enhanced since the electrostatic sensor detection signal is output only when the object is detected by the electrostatic capacity sensor 281 after the object is detected by the other type sensor 282.

The configuration of the electrostatic capacity sensor in which the detection sensitivity can be changed as described above will be described with reference to FIG. 24.

Figure 24:
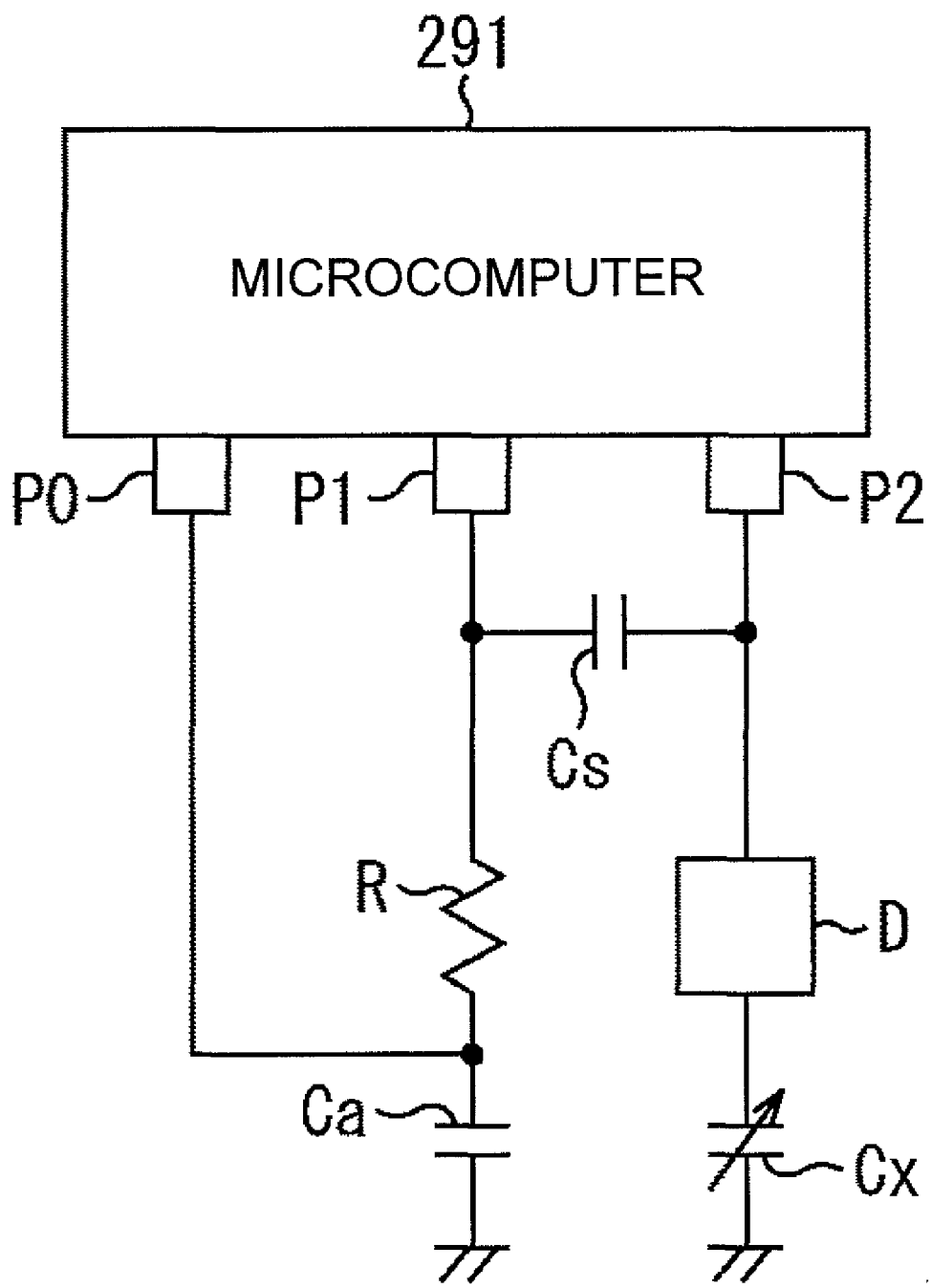
FIG. 24 is a view showing a configuration example of the electrostatic capacity sensor of FIG. 21.

FIG. 24 is a view showing a configuration example of the electrostatic capacity sensor.

A microcomputer 291 includes a CPU (Central Processing Unit), a RAM (Random Access Memory), and a ROM (Read Only Memory), where the CPU develops a predetermined program stored in the ROM, as necessary, in the RAM and executes the program to thereby execute various types of processes. More specifically, the microcomputer 291 executes the program to output signals of Hi and Low as output signals to the terminals P0 to P2, set HiZ (high impedance state: state in which a signal is not accepted in state of high impedance with respect to an input signal, and in which an output signal is neither Hi nor Low), measures the input signal (voltage of terminal) as necessary, and executes the processes corresponding to the measurement result.

The terminal P0 is a terminal for supplying power to charge in a capacitor Ca, and applies a charging voltage to the capacitor Ca when controlled to Hi. The terminal P0 stops the charging when controlled to HiZ (high impedance state).

The terminal P1 is a terminal for discharging the charges charged in the capacitor Ca through a resistor R and discharging the charges charged in the capacitor Cs, and discharges the charges charged in the capacitors Ca, Cs when controlled to Low and stops the discharge when controlled to HiZ.

The terminal P2 is a terminal for discharging the charges charged in a capacitor Cx and measuring the charging voltage of the capacitor Cx, and discharges the charges charged in the capacitor Cx when controlled Low, stops the discharge of the capacitor Cx when controlled to HiZ, and measures the charging voltage Vx of the capacitor Cx when controlled to Hi.

The capacitor Ca charges the charges at the voltage applied by the terminal P0 and discharges the charges through the resistor R by the terminal P1. The capacitors Cs, Cx are connected in series, and are charged by the charges charged in the capacitor Ca.

The capacitor Cx is a notation on the circuit configuration, and shows a measurement object of the electrostatic capacity such as a human body that contacts with the electrode D as a condenser. Therefore, the capacity of the capacitor Cx is the electrostatic capacity of the human body of a case that the human body contacts with the electrode D, and is the electrostatic capacity in the non-contacting state when the human body is not contacting with the electrode D.

The electrode D may have a configuration of being contacted directly with the human body, or may have a configuration of being contacted indirectly with the human body through an insulator. In the following description, a case in which the electrode D is a type contacted indirectly with the human body through the insulator will be described, but obviously, the electrode D may be a type contacted directly with the human body. However, if the electrode D is a type contacted through the insulator, the change in an electrostatic capacity (a difference in an electrostatic capacity of the capacitor Cx between the case of being contacted with the human body and the case of being contacted with the human body) becomes small compared to a type the human body is contacted directly.

Figure 25:
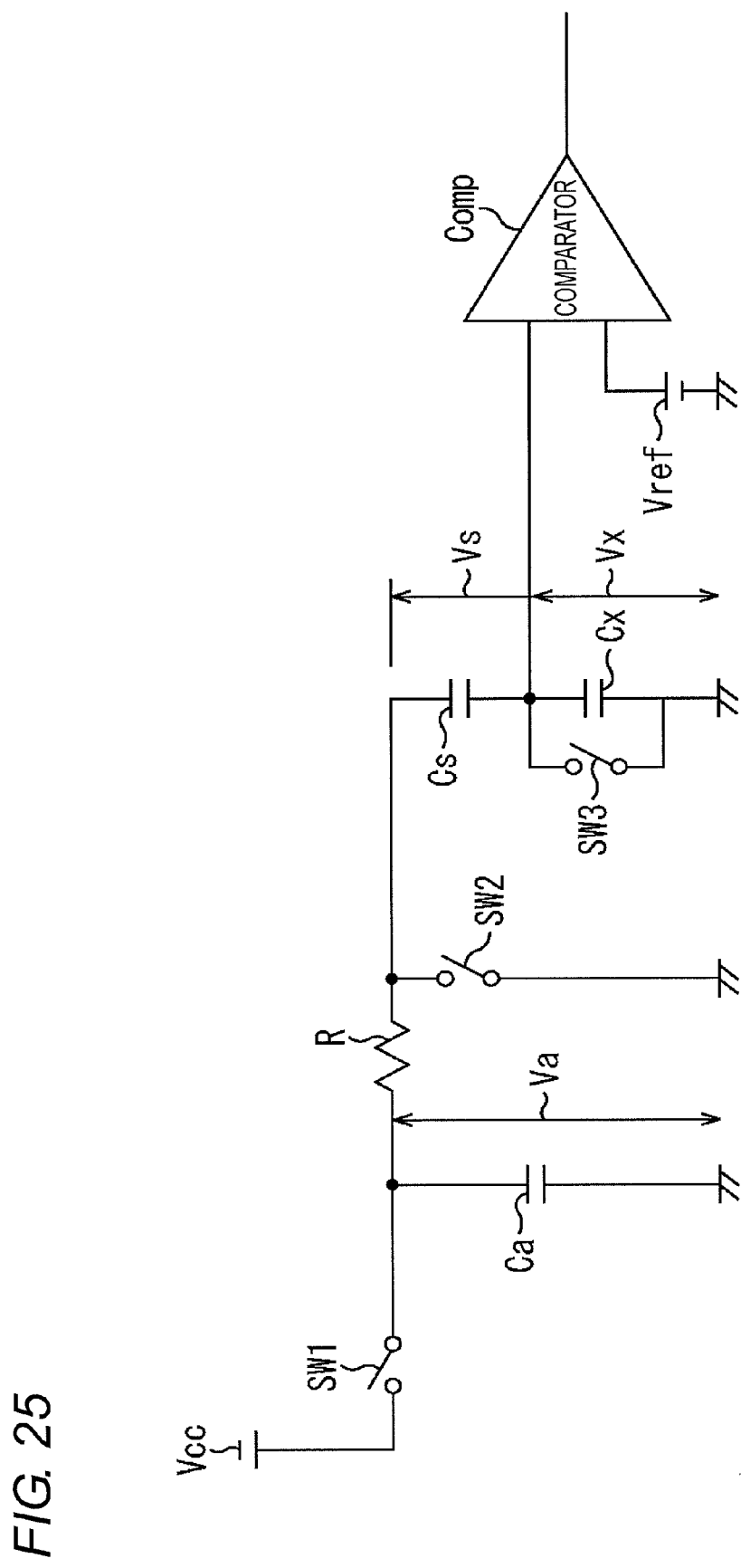
FIG. 25 is a circuit diagram explaining the concept of the electrostatic capacity sensor of FIG. 24.

FIG. 25 is a circuit diagram describing a concept of the electrostatic capacity sensor of FIG. 24.

Switches SW1 to SW3 simply indicate the operation states of the terminals P0 to P2. In other words, when the terminal P0 is controlled to Hi, the switch SW1 in the circuit of FIG. 25 is turned ON, and the power supply Vcc consequently charges the capacitor Ca with the charging voltage Vcc. When the terminal P0 is controlled to HiZ, the switch SW1 is turned OFF. The switch SW2 in the circuit of FIG. 25 is turned ON when the terminal P1 is controlled to Low, and turned OFF when the terminal P1 is controlled to Hiz.

Furthermore, the switch SW3 is turned ON when the terminal P2 is controlled to Low, and turned OFF when the terminal P2 is controlled to HiZ. When the terminal P2 is controlled to Hi, a comparator Comp compares the charging voltage Vx of the capacitor Cx and the reference voltage Vref, and outputs the comparison result. The comparator Comp is a function implemented by the microcomputer 291, and is not an actual comparator circuit.

The charging voltages of the capacitors Ca, Cs, Cx are respectively indicated as Va, Vs, Vx.

The process by the electrostatic capacity sensor is as follows.

In first step, the microcomputer 291 controls the output of the terminal P0 to Hi to charge the capacitor Ca by the power supply Vcc. In other words, the switch SW1 shown in FIG. 25 is turned ON by controlling the output of the terminal P0 to Hi, whereby the power is supplied from the power supply Vcc to the capacitor Ca and the capacitor Ca is charged with the charging voltage Va=Vcc.

In second step, the microcomputer 291 controls all terminals P0 to P2 to HiZ (high impedance state) for a predetermined time t to hold the charging state of the capacitor Ca. In other words, the switches SW1 and SW2 shown in FIG. 25 are turned OFF by controlling the terminals P0 to P2 to the HiZ state, whereby the capacitor Ca is maintained in a state charged with the charging voltage Va=Vcc.

In third step, the microcomputer 291 increments the counter n by one.

In fourth step, the microcomputer 291 controls the terminal P0 to HiZ for a predetermined time, and controls the terminals P1, P2 to Low to discharge the charges charged in the capacitors Ca, Cs, Cx. In this case, the charges charged in the capacitors Cs, Cx are discharged through a ground part instantaneously, but the charges charged in the capacitor Ca are discharged to the ground part from the switch SW2 through the resistor R, and thus the discharging of the charges gradually proceeds and only one part of the charges charged in the capacitor Ca is discharged within a predetermined time t.

In fifth step, the microcomputer 291 controls the terminals P0 to P2 to the HiZ state for a predetermined time t, so that the charges charged in the capacitor Ca (charges remaining with one part discharged through the process of fourth step) move to the capacitors Cs, Cx, and the capacitors Ca, Cs, Cx are held in the charged state. In this case, the capacitor Ca and the synthesized capacitor of the capacitors Cs, Cx form a parallel circuit, so that the charging voltage Va of the capacitor Ca is equal to the sum of the charging voltages Vs, Vx of the capacitors Cs, Cx. Furthermore, the charging voltages Vs and Vx of the capacitors Cs, Cx have a relationship of a reciprocal ratio of the capacities of the capacitors Cs, Cx.

In sixth step, the microcomputer 291 controls the terminal P2 to the Hi state for a predetermined time t, and measures the charging voltage Vx of the capacitor Cx by the terminal P2 for the predetermined time t to acquire the charging voltage of the capacitor Cx.

In seventh step, the microcomputer 291 determines whether or not the measured charging voltage Vx of the capacitor Cx is smaller than the reference voltage Vref. For instance, if determined that the charging voltage Vx is not smaller than the reference voltage Vref, the process is returned to third step. In other words, the processes of third to seventh steps are repeated until determined that the charging voltage Vx is smaller than the reference voltage Vref, and the value of the counter n is incremented according to the number of repeated processing times.

If determined that the charging voltage Vx is smaller than the reference voltage Vref in seventh step, the microcomputer 291 calculates the electrostatic capacity Cx based on the value of the counter n, the electrostatic capacities of the capacitors Ca, Cs, the resistor R, and the charging voltage Vcc of the power supply Vcc to obtain the measurement result of the capacitor Cx in eighth step. The process is then terminated.

The detection sensitivity of the electrostatic capacity sensor can be enhanced (lowered) by pulling up (pulling down) the voltage of the reference voltage Vref of the electrostatic capacity sensor described above.

For instance, the microcomputer 291 A/D converts the charging voltage Vx measured by the terminal P2 and inputs with the same. In this case, the reference voltage Vref is held as a threshold value in terms of software in the microcomputer 291.

For instance, the microcomputer 291 holds in advance first to third threshold values in descending order, and sets the second threshold value of the first to the third threshold values as a standard threshold value. In this case, the microcomputer 291 changes the second threshold value to the first threshold value when setting the detection sensitivity of the electrostatic sensor from a standard sensitivity to a high sensitivity. The microcomputer 291 changes the second threshold value to the third threshold value when setting the detection sensitivity of the electrostatic sensor from the standard sensitivity to a low sensitivity.

Consider using the door knob sensor 251 described above in place of the door knob sensor 140 in the passive entry system of FIG. 1. In this case, the ECU 12 performs the ECU process described below for the control process of unlocking and locking the door.

Figure 26:
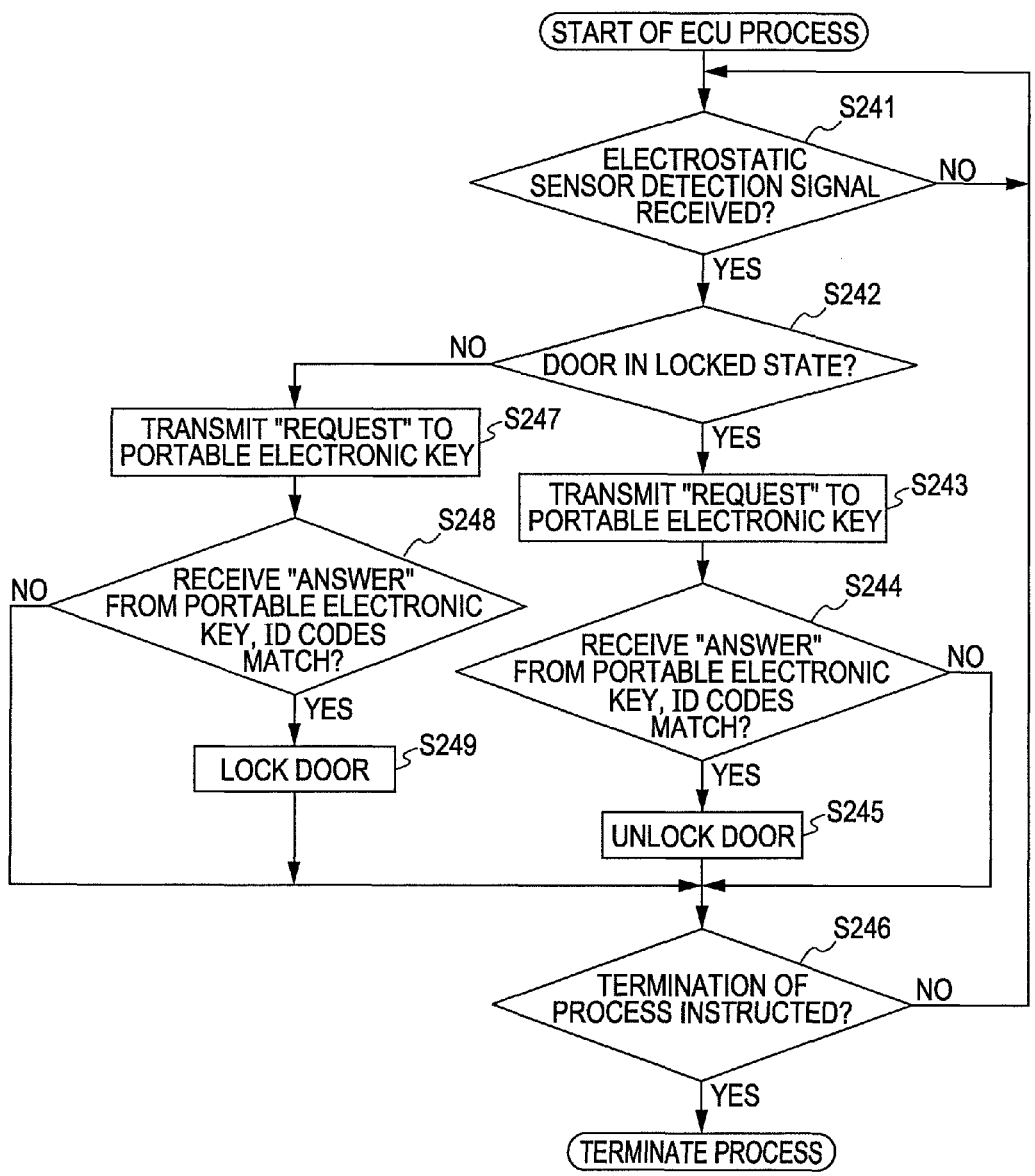
FIG. 26 is a flowchart explaining an ECU process by an ECU of FIG. 1.

The ECU process by the ECU 12 will be described with reference to the flowchart of FIG. 26.

In step S241, the ECU 12 determines whether or not the electrostatic sensor detection signal is received. When detecting the object, the electrostatic capacity sensor 281 outputs the electrostatic sensor detection signal to the ECU 12, and the ECU 12 receives such a electrostatic sensor detection signal. Therefore, the ECU 12 determines whether or not the object is detected by the electrostatic capacity sensor 281 through the process of step S241.

The process of step S241 is determined as NO unless the electrostatic sensor detection signal is output from the electrostatic capacity sensor 281 to the ECU 12, in which case the process returns to step S241 and the subsequent process is repeated.

If the electrostatic sensor detection signal is output from the electrostatic capacity sensor 281 to the ECU 12, the process of step S241 is determined as YES, and the process proceeds to step S242. In step S242, the ECU 12 determines whether or not the door 112 is in the locked state.

IF the door 112 is the unlocked state, the process of step S242 is determined as NO, and the process proceeds to step S247. The processes after step S250 will be described later.

If the door 112 is in the locked state, the process of step S242 is determined as YES and the process proceeds to step S243. In step S243, the ECU 12 transmits the "request" to the portable electronic key 11.

In step S244, the ECU 12 receives the "answer" from the portable electronic key 11, and determines whether or not the ID codes match.

If the "answer" itself is not transmitted from the portable electronic key 11, or if the "answer" itself is transmitted and received by the ECU 12 but the ID code is not contained therein or the contained ID code is different from the code given to the person having legitimate driving authority, the process of step S244 is determined as NO, and the process proceeds to step S246. The processes after step S246 will be described later.

If the "answer" transmitted from the portable electronic key 11 is received by the ECU 12 and the ID code matches the code given to the person having legitimate driving authority, the process of step S244 is determined as YES, and the process proceeds to step S245.

In other words, the authentication process is performed in the processes of steps S243 and S244, where the process of step S244 is determined as NO when the authentication process fails and the processes after step S246 are executed. When the authentication process is successful, the process of step S244 is determined as YES, and the process proceeds to step S245.

In step S245, the ECU 12 controls the motor 15 and unlocks the door 112.

In step S246, the ECU 12 determines whether or not the termination of the process is instructed.

If determined that the termination of the process is not yet instructed in step S246, the process returns to step S241, and the subsequent processes are repeated.

If determined that the termination of the process is instructed in step S246, the ECU process is terminated.

If determined that the process of step S242 is NO, the ECU 12 transmits the "request" to the portable electronic key 11 in step S247.

In step S248, the ECU 12 receives the "answer" from the portable electronic key 11, and determines whether or not the ID codes match.

If the "answer" itself is not transmitted from the portable electronic key 11, or if the "answer" itself is transmitted and received by the ECU 12 but the ID code is not contained therein or the contained ID code is different from the code given to the person having legitimate driving authority, the process of step S248 is determined as NO, and the process proceeds to step S246.

If the "answer" transmitted from the portable electronic key 11 is received by the ECU 12 and the ID code matches the code given to the person having legitimate driving authority, the process of step S248 is determined as YES, and the process proceeds to step S249.

In other words, the authentication process is performed in the processes of steps S247 and S248, where the process of step S248 is determined as NO when the authentication process fails and the processes after step S246 are executed. When the authentication process is successful, the process of step S249 is determined as YES, and the process proceeds to step S249.

In step S249, the ECU 12 controls the motor 15 and locks the door 112. The process then proceeds to step S246 and the subsequent processes are repeated.

The series of processes (or some of the processes) described above, for example, the process according to at least one part of the flowchart of FIG. 4 described above may be executed by hardware or may be executed by software.

Figure 27:
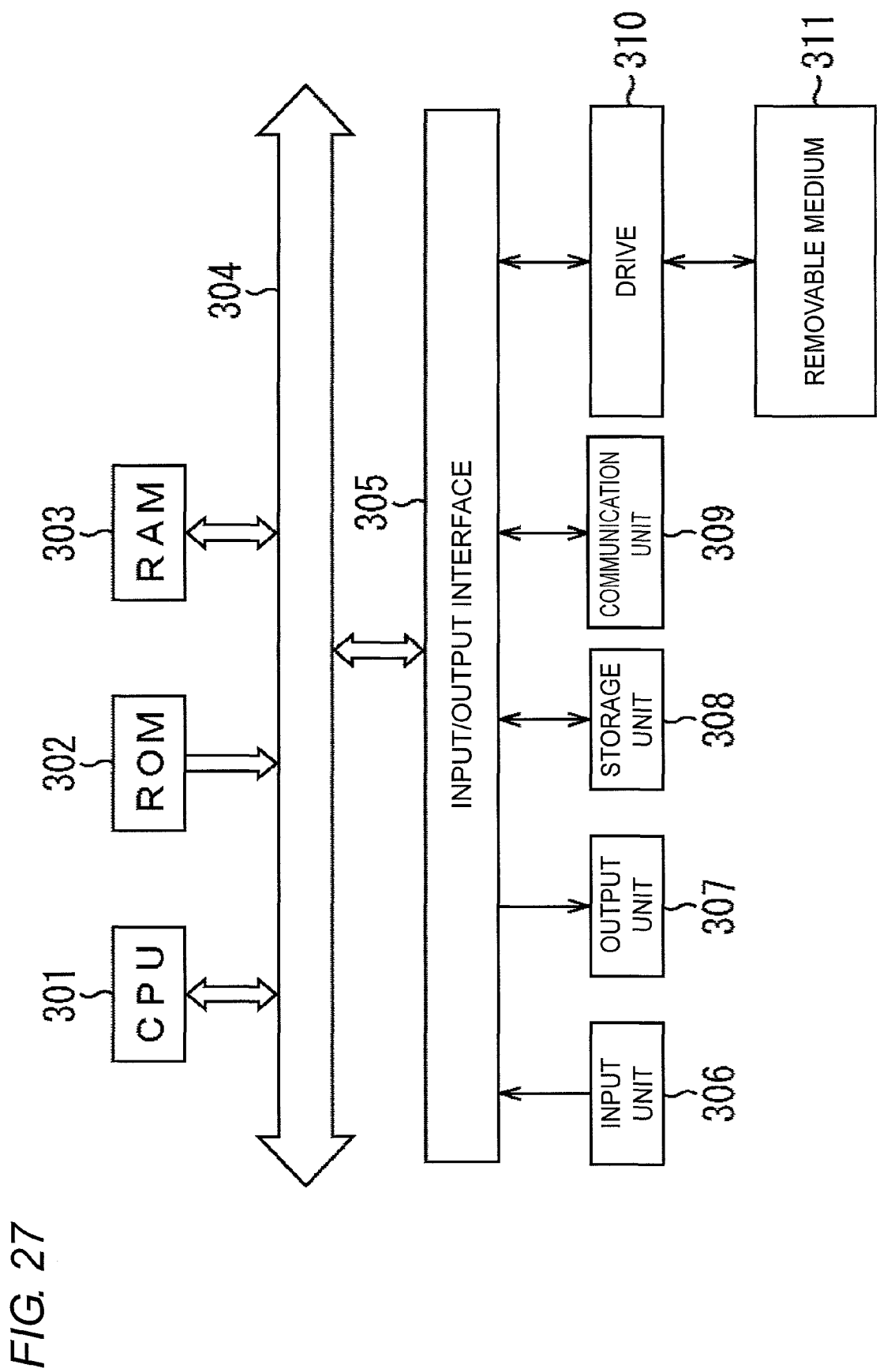
FIG. 27 is a block diagram showing a configuration example of a hardware of a computer applied with one or more embodiments of the present invention.

When executing the series of processes (or some of the processes) by software, all or one part of the door knob sensor 140 and the ECU 12 may be configured by a computer as shown in FIG. 27.

In FIG. 27, the CPU 301 executes various types of processes according to programs recorded in a ROM 302, or programs loaded from a storage unit 308 to a RAM 303. Data and the like necessary for the CPU 301 to execute the various types of processes are also appropriately stored in the RAM 303.

The CPU 301, the ROM 302, and the RAM 303 are mutually connected through a bus 304. An input/output interface 305 is also connected to the bus 304.

The input/output interface 305 is connected with an input unit 306 such as a keyboard and a mouse, an output unit 307 such as a display, the storage unit 308 configured by a hard disc and the like, and a communication unit 309 configured by a modem, a terminal adapter and the like. The communication unit 309 performs the communication process with other devices through a network including the Internet. The communication unit 309 also performs the transmission and reception process with the portable electronic key 11 through an antenna (not shown). In other words, the communication unit 309 on the ECU 12 side transmits the "request" to the portable electronic key 11, and receives the "answer" from the portable electronic key 11.

The input/output interface 305 is also connected with a drive 310, as necessary, where a removal medium 311 such as a magnetic disc, an optical disc, a magnetic optical disc, or a semiconductor memory is appropriately attached so that the computer program can be read out therefrom and installed in the storage unit 308, as necessary.

When executing the series of processes by software, the program configuring such software is installed from the network or the recording medium to a computer incorporated in a dedicated hardware or a universal personal computer capable of executing various types of functions by installing various types of programs.

As shown in FIG. 6, the recording medium containing such programs is not only configured by a removal medium (package medium) 311 including a magnetic disc (include a floppy disc) recorded with the program, an optical disc (include CD-ROM (Compact Disk-Read Only Memory), DVD (Digital Versatile Disk)), a magnetic optical disc (include MD (Mini-Disk)), or a semiconductor memory distributed to provide the program to the user separate from the device main body, but is also configured by the ROM 302 recorded with the program, the hard disc arranged in the storage unit 308, and the like provided to the user by being incorporated in the device main body in advance.

In the present specification, the steps describing the program recorded in the recording medium contain not only the processes performed in time-series along the relevant order, but also processes that are not necessarily processed in time-series but are executed in parallel or individually.

The system applied with the present invention is not limited only to the system mounted on the vehicle, as described above, and merely needs to be a system for controlling the operation based on the approach of the object. The system herein represents the entire device configured by a plurality of processing devices and processing units.

For instance, the door knob sensor is mounted on a vehicle (four-wheel vehicle or motorcycle) driven by the user in the above-described examples, but may be mounted on vehicles including a small plane, machineries, equipments, buildings, and facilities.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control device comprising: an electric wave sensor set with a first detection region; an electrostatic capacity sensor set with a second detection region; and a control unit for controlling locking and unlocking of a door of a vehicle based on a detection result by the electric wave sensor and a detection result by the electrostatic capacity sensor, wherein the electric wave sensor is variably set with the detection region, wherein a first distance with respect to the door of the vehicle is set as the first detection region in the electric wave sensor, wherein a second distance shorter than the first distance is set as the second detection region in the electrostatic capacity sensor, wherein when a state of the door of the vehicle is a locked state, the control unit performs a control to unlock the door when the object is detected by the electric wave sensor, and wherein when the state of the door of the vehicle is an unlocked state: if the object is detected by both the electrostatic capacity sensor and the electric wave sensor, the control unit performs a control to lock the door, and if the object is detected by the electrostatic capacity sensor but is not detected by the electric wave sensor, the control unit decides not to perform the control to lock the door.

2. The control device according to claim 1, wherein when the object is detected by the electric wave sensor, the control unit further performs an authentication process of a portable electronic key.

3. The control device according to claim 1, wherein the control unit further performs a control to prohibit the locking of the door of the vehicle for a predetermined period when the object is detected by the electric wave sensor.

4. The control device according to claim 3, wherein the control unit performs a control to stop the detecting operation by the electrostatic capacity sensor for a predetermined period as the control to prohibit the locking of the door for a predetermined period.

5. The control device according to claim 3, wherein the control unit performs a control to prohibit the locking of the door of the vehicle for a predetermined period based on the detection result by the electrostatic capacity sensor as the control to prohibit the locking of the door for a predetermined period.

6. The control device according to claim 1, wherein the control unit further performs a control to prohibit the unlocking of the door of the vehicle for a predetermined period when the object is detected by the electrostatic capacity sensor.

7. The control device according to claim 6, wherein the control unit performs a control to stop the detecting operation by the electric wave sensor for a predetermined period as the control to prohibit the unlocking of the door for a predetermined period.

8. The control device according to claim 6, wherein the control unit performs a control to prohibit the unlocking of the door of the vehicle for a predetermined period based on the detection result by the electric wave sensor as the control to prohibit the unlocking of the door for a predetermined period.

9. The control device according to claim 1, wherein the control unit performs a control to supply power only to the electric wave sensor when the state of the door of the vehicle is the locked state, and performs a control to supply power only to the electrostatic capacity sensor when the state of the door of the vehicle is the unlocked state.

10. The control device according to claim 1, wherein the electrostatic capacity sensor changes a detection sensitivity of the electrostatic capacity sensor according to a presence of detection of the object by the other type sensor.

11. The control device according to claim 1, wherein the electrostatic capacity sensor enhances a detection sensitivity of the electrostatic capacity sensor based on the detection of the object by the other type sensor.

12. A control method of a control device including an electric wave sensor set with a first detection region and an electrostatic capacity sensor set with a second detection region, comprising: controlling locking and unlocking of a door of a vehicle based on a detection result by the electric wave sensor and a detection result by the electrostatic capacity sensor; variably setting the electric wave sensor with the detection region; setting a first distance with respect to the door of the vehicle as the first detection region in the electric wave sensor; and setting a second distance shorter than the first distance as the second detection region in the electrostatic capacity sensor; wherein when a state of the door of the vehicle is a locked state, the control unit performs a control to unlock the door when the object is detected by the electric wave sensor, and wherein when the state of the door of the vehicle is an unlocked state: if the object is detected by both the electrostatic capacity sensor and the electric wave sensor, the control unit performs a control to lock the door, and if the object is detected by the electrostatic capacity sensor but is not detected by the electric wave sensor, the control unit decides not to perform the control to lock the door.

13. The control method according to claim 12, wherein a first operation is controlled based on the detection result of the electric wave sensor set with the first detection region, and a second operation is controlled based on the detection result of the electrostatic capacity sensor set with the second detection region in the control of the predetermined operation.

14. A control device comprising: a first sensor set with a first detection region; a second sensor set with a second detection region; and a control unit for controlling a predetermined operation based on a detection result by the first sensor and a detection result by the second sensor, wherein the control device is a device for controlling locking and unlocking of a door of a vehicle; wherein when a state of the door of the vehicle is a locked state, the first sensor detects an object when the object enters a first detection distance, and the control unit performs a control to unlock the door when the object is detected by the first sensor; wherein when the state of the door of the vehicle is an unlocked state, the second sensor detects an object when the object enters a second detection distance, and the control unit performs a control to lock the door when the object is detected by the second sensor; and wherein the control unit performs a control to supply power only to the first sensor when the state of the door of the vehicle is the locked state, and performs a control to supply power only to the second sensor when the state of the door of the vehicle is the unlocked state.

* * * * *